(12) United States Patent
Wang

(10) Patent No.: US 12,549,775 B2
(45) Date of Patent: Feb. 10, 2026

(54) ITERATIVELY UPDATING A FILTERING MODEL

(71) Applicant: Tencent Technology (Shenzhen) Company Limited, Guangdong (CN)

(72) Inventor: Liqiang Wang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 107 days.

(21) Appl. No.: 18/389,483

(22) Filed: Nov. 14, 2023

(65) Prior Publication Data

US 2024/0080495 A1  Mar. 7, 2024

Related U.S. Application Data

(63) Continuation of application No. PCT/CN2022/126828, filed on Oct. 21, 2022.

(30) Foreign Application Priority Data

Dec. 21, 2021 (CN) .......................... 202111576383.3

(51) Int. Cl.
*H04N 19/80* (2014.01)
*H04N 19/117* (2014.01)
(Continued)

(52) U.S. Cl.
CPC .......... *H04N 19/80* (2014.11); *H04N 19/117* (2014.11); *H04N 19/132* (2014.11);
(Continued)

(58) Field of Classification Search
CPC .... H04N 19/80; H04N 19/117; H04N 19/132; H04N 19/154; H04N 19/172;
(Continued)

(56) References Cited

U.S. PATENT DOCUMENTS

| | | | | |
|---|---|---|---|---|
| 2021/0397846 A1* | 12/2021 | Chang | .................... | A63F 13/828 |
| 2022/0109853 A1* | 4/2022 | Zhang | .................. | H04N 19/117 |
| 2023/0062752 A1* | 3/2023 | Lainema | .............. | H04N 19/149 |

FOREIGN PATENT DOCUMENTS

| | | |
|---|---|---|
| CN | 111083498 A | 4/2020 |
| CN | 113259671 A | 8/2021 |

(Continued)

OTHER PUBLICATIONS

International Search Report and Written Opinion received for PCT Patent Application No. PCT/CN2022/126828, mailed on Dec. 6, 2022, 9 pages of Original Document Only.

(Continued)

*Primary Examiner* — Tracy Y. Li
(74) *Attorney, Agent, or Firm* — ArentFox Schiff LLP

(57) ABSTRACT

A processing method includes generating first training data through a $k^{th}$ updated video coding application, the first training data including a sample original video frame as a training label, and a first sample to-be-filtered reconstructed frame output from the $k^{th}$ updated video coding application and corresponding to the sample original video frame. The method further includes, based on the sample original video frame and the first sample to-be-filtered reconstructed frame, training a second filtering model in the $k^{th}$ updated video coding application to obtain the second filtering model in a training convergence state, and integrating the second filtering model in the training convergence state into the $k^{th}$ updated video coding application to obtain a $(k+1)^{th}$ updated video coding application. The method further includes, when the $(k+1)^{th}$ updated video coding application meets a filtering quality requirement condition, determining the $(k+1)^{th}$ updated video coding application as a target video coding application.

20 Claims, 11 Drawing Sheets

(51) Int. Cl.
*H04N 19/132* (2014.01)
*H04N 19/154* (2014.01)
*H04N 19/172* (2014.01)
*H04N 19/42* (2014.01)
*H04N 19/593* (2014.01)

(52) U.S. Cl.
CPC ......... *H04N 19/154* (2014.11); *H04N 19/172* (2014.11); *H04N 19/42* (2014.11); *H04N 19/593* (2014.11)

(58) Field of Classification Search
CPC .... H04N 19/42; H04N 19/593; H04N 19/176; H04N 19/82; H04N 19/86; G06N 20/00; Y02T 10/40
See application file for complete search history.

(56) References Cited

FOREIGN PATENT DOCUMENTS

| | | | | |
|---|---|---|---|---|
| CN | 113810763 A | | 12/2021 | |
| CN | 114208203 A | * | 3/2022 | ........... H04N 19/117 |
| WO | 2020/192034 A1 | | 10/2020 | |
| WO | WO-2022182265 A1 | * | 9/2022 | ........... G06N 3/0455 |

OTHER PUBLICATIONS

Office Action received for Chinese Patent Application No. 202111576383.3, mailed on May 21, 2024, 14 pages (6 pages of English Translation and 8 pages of Original Document).

* cited by examiner

ITERATIVELY UPDATING A FILTERING MODEL

RELATED APPLICATIONS

This application is a continuation of International Patent Application No. PCT/CN2022/126828, filed on Oct. 21, 2022, which claims priority to Chinese Patent Application No. 202111576383.3, filed on Dec. 21, 2021. The disclosures of the prior applications are hereby incorporated by reference in their entirety.

FIELD OF THE TECHNOLOGY

This application relates to the technical field of computers, including a data processing method and apparatus, a computer device, a computer-readable storage medium, and a computer program product.

BACKGROUND OF THE DISCLOSURE

At present, in the video coding and compression process, video coding and compression algorithms all adopt lossy compression, that is, a certain distortion is present between an image of a coded and compressed video and an image of an original video; furthermore, in the case of high compression rate, image warping and distortion are more serious.

A loop filter has been introduced in an existing video coding standard to filter the image of the compressed video, so that the distortion degree is reduced, and the image quality of the compressed video can be infinitely close to the image quality of the original video. However, since a filtering coefficient of a related loop filter is mainly designed manually, which relies too much on manual experience, so the accuracy is not high and the distortion degree cannot be reduced well.

SUMMARY

Embodiments of this disclosure provide a data processing method and apparatus, a computer device, a computer-readable storage medium, and a computer program product, which can improve the filtering performance, reducing the image distortion degree of a coded video and enhancing the image quality of the coded video.

In an embodiment, a data processing method includes generating first training data through a $k^{th}$ updated video coding application including a first filtering model, the first training data including a sample original video frame as a training label, and a first sample to-be-filtered reconstructed frame output from the $k^{th}$ updated video coding application and corresponding to the sample original video frame. K is a positive integer. The method further includes, based on the sample original video frame and the first sample to-be-filtered reconstructed frame, training a second filtering model in the $k^{th}$ updated video coding application to obtain the second filtering model in a training convergence state, and integrating the second filtering model in the training convergence state into the $k^{th}$ updated video coding application to obtain a $(k+1)^{th}$ updated video coding application. The method further includes, in response to a determination that the $(k+1)^{th}$ updated video coding application meets a filtering quality requirement condition, determining the $(k+1)^{th}$ updated video coding application as a target video coding application for performing video coding processing.

In an embodiment, a data processing apparatus includes processing circuitry configured to generate first training data through a $k^{th}$ updated video coding application including a first filtering model, the first training data including a sample original video frame as a training label, and a first sample to-be-filtered reconstructed frame output from the $k^{th}$ updated video coding application and corresponding to the sample original video frame. K is a positive integer. The processing circuitry is further configured to, based on the sample original video frame and the first sample to-be-filtered reconstructed frame, train a second filtering model in the $k^{th}$ updated video coding application to obtain the second filtering model in a training convergence state. The processing circuitry is further configured to integrate the second filtering model in the training convergence state into the $k^{th}$ updated video coding application to obtain a $(k+1)^{th}$ updated video coding application, and, in response to a determination that the $(k+1)^{th}$ updated video coding application meets a filtering quality requirement condition, determine the $(k+1)^{th}$ updated video coding application as a target video coding application for performing video coding processing.

In an embodiment, a non-transitory computer-readable storage medium stores computer-readable instructions thereon, which, when executed by processing circuitry, cause the processing circuitry to perform a data processing method that includes generating first training data through a $k^{th}$ updated video coding application including a first filtering model, the first training data including a sample original video frame as a training label, and a first sample to-be-filtered reconstructed frame output from the $k^{th}$ updated video coding application and corresponding to the sample original video frame. K is a positive integer. The method further includes, based on the sample original video frame and the first sample to-be-filtered reconstructed frame, training a second filtering model in the $k^{th}$ updated video coding application to obtain the second filtering model in a training convergence state, and integrating the second filtering model in the training convergence state into the $k^{th}$ updated video coding application to obtain a $(k+1)^{th}$ updated video coding application. The method further includes, in response to a determination that the $(k+1)^{th}$ updated video coding application meets a filtering quality requirement condition, determining the $(k+1)^{th}$ updated video coding application as a target video coding application for performing video coding processing.

When In the embodiments of this disclosure, after the filtering model is deployed to the video coding application, the video coding application can be iteratively updated, the training process of the filtering model is repeated by updating the training data, and the video coding application is continuously deployed and updated, so that the consistency of the training effect and the test effect of the filtering model can be improved, the coding efficiency can be enhanced, the filtering quality of the filtering model deployed in the video coding application can be improved without depending on manual experience, and the distortion degree of the coded video can be reduced. In conclusion, this disclosure can improve the filtering performance, reduce the image distortion degree of the coded video and enhance the image quality of the coded video.

BRIEF DESCRIPTION OF THE DRAWINGS

To describe the technical solutions in the embodiments of the present disclosure more clearly, the accompanying drawings describing the embodiments are briefly described below. The accompanying drawings in the following description only show some embodiments of the present disclosure, and a person of ordinary skill in the art may still derive other drawings from these accompanying drawings.

DESCRIPTION OF EMBODIMENTS

The technical solutions in embodiments of this disclosure are described in the following with reference to the accompanying drawings in the embodiments of this disclosure. The described embodiments are merely some rather than all of the embodiments of this application. All other embodiments obtained by a person of ordinary skill in the art based on the embodiments of this application fall within the protection scope of this disclosure.

Figure 1:
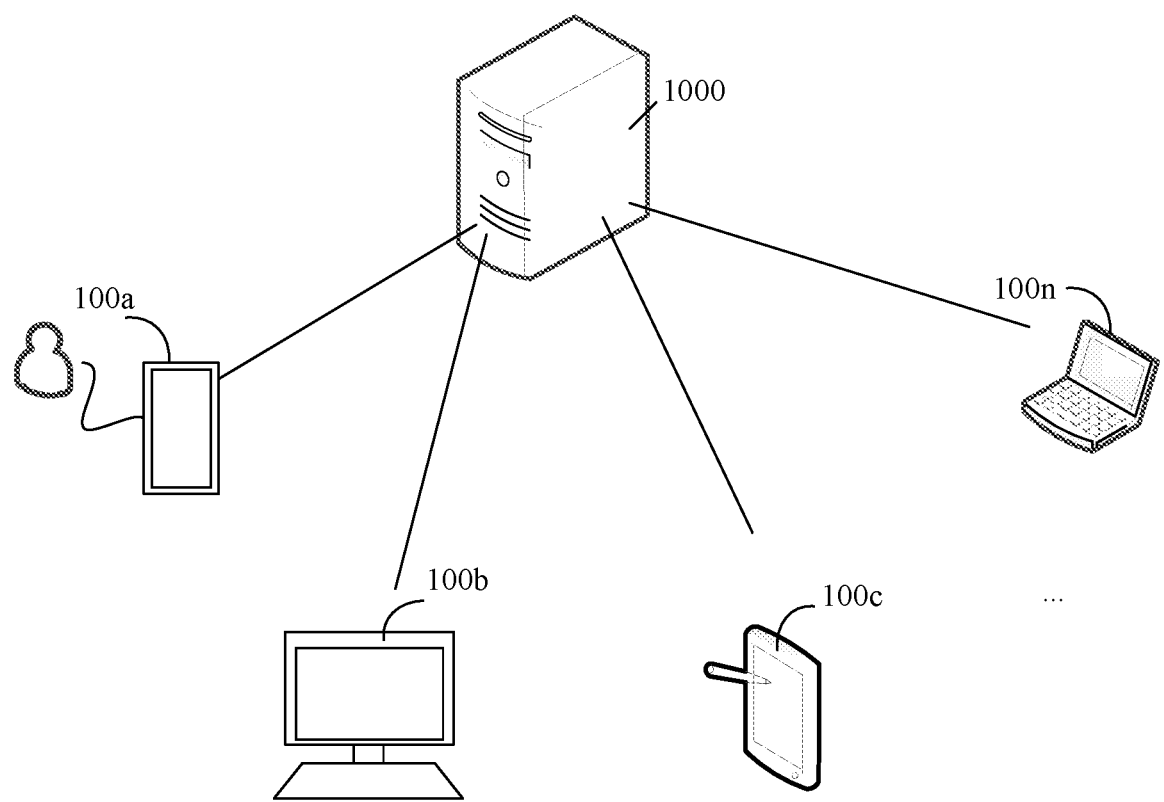
FIG. 1 is a network architecture diagram according to an embodiment of this disclosure.

Referring to FIG. 1, FIG. 1 is a structural schematic diagram of a network architecture according to an embodiment of this disclosure. As shown in FIG. 1, the network architecture may include a service server 1000 and a terminal device cluster. The terminal device cluster may include one or more terminal devices, and the number of the terminal devices will not be limited here. As shown in FIG. 1, a plurality of terminal devices specifically may include a terminal device 100a, a terminal device 100b, a terminal device 100c, . . . , and a terminal device 100n. As shown in FIG. 1, the terminal device 100a, the terminal device 100b, the terminal device 100c, . . . , and the terminal device 100n may be in network connection with the service server 1000 above, so that each of the terminal devices may interact data with the service server 1000 through the network connection. The network connection here is not limited to a connection mode, and may be direct or indirect connection through a wired communication mode, may be direct or indirect connection through a wireless communication mode, or may be connection through other modes, which are not limited by the embodiments of this disclosure here.

Each of the terminal device may be installed with a target application in an integrated manner. When the target application runs in each of the terminal devices, the target application may interact data with the service server 1000 shown in FIG. 1 above. The target application may include an application with a function of displaying data information such as texts, images, audios and videos. This disclosure may include a social application, a multimedia application (such as a video application), an entertainment application (such as a game application), an education application, a live broadcast and other applications with video coding functions. Certainly, the application may be other applications with data information display functions and video coding functions, and no examples will be given here. The application may be an independent application, or may be an embedded subapplication integrated in a certain application (such as a social application, an education application or a multimedia application), which will not be limited here.

For the convenience of understanding, the embodiments of this disclosure may select one terminal device from the plurality of terminal devices shown in FIG. 1 to serve as a target terminal device. For example, the embodiments of this disclosure may take the terminal device 100a shown in FIG. 1 as the target terminal device. A target application with a video coding function may be integrated in the target terminal device. At this time, the target terminal device may interact data with the service server 1000 through a service data platform corresponding to an application client.

It is to be understood that in the embodiments of this disclosure, the computer device (for example, the terminal device 100a and the service server 1000) with the video coding function may realize data coding and data transmission on multimedia data (for example, video data) through a cloud technology. The cloud technology refers to a hosting technology for unifying a series of resources such as hardware, software and network in a wide area network or a local area network to realize data calculation, storage, processing and sharing.

The cloud technology may be the generic term of a network technology, an information technology, an integrated technology, a management platform technology and an application technology, and may form a resource pool, be used on demand and be flexible and convenient. A cloud computing technology will become an important support. The background service of a technical network system requires a large number of computing and storage resources, such as a video website, a photo website and more portal websites. With the high development and application of the Internet industry, each article may have its own identification mark in the future, which needs to be transmitted to a background system for logical processing. Different levels of data will be processed separately, and all kinds of industry data requires strong system backing support, which can be realized through cloud computing.

For example, the data processing method provided by the embodiments of this disclosure may be applied to scenarios with high resolution ratio and high frame rate, such as a video viewing scenario, a video call scenario, a video transmission scenario, a cloud conference scenario and a live broadcast scenario. Taking the video call scenario as an example, in the video call scenario, during video call of two users, a terminal device corresponding to a user a may perform video coding processing on video data associated with the user a based on a target video coding application, and a video compression code stream is transmitted to a terminal device corresponding to a user b (that is, a user performing video call with the user a) after a video compression code stream is obtained, so that the terminal device corresponding to the user b may perform decoding and output video data associated with the user a in a display interface.

The cloud conference is an efficient, convenient and low-cost conference form based on a cloud computing technology. A user can share voice, data files and videos with teams and users around the world rapidly and efficiently only by performing simple and easy-to-use operation through an Internet interface, and cloud conference service providers help users to operate complicated technologies such as data transmission and processing in conferences. At present, the cloud conference mainly focuses on a service content taking software as a service (SaaS) as a main body, including telephone, network, video and other service forms. The video conference based on cloud computing is called the cloud conference. In the era of cloud conference, data transmission, processing and storage are all processed by computer resources of video conference manufacturers. Users don't need to purchase expensive hardware and tediously installed software at all, and only need to open a browser and log in a corresponding interface to perform an efficient remote conference. A cloud conference system supports multi-server dynamic cluster deployment and provides multiple high-performance servers, thereby greatly improving the stability, security and availability of the conference. In recent years, video conferences can greatly improve the communication efficiency, continuously reduce the communication cost and upgrade the internal management level, so the video conferences are welcomed by numerous users and have been widely applied to various fields of traffic, transportation, finance, operators, education and enterprises. It is certain that after using cloud computing, the video references are more attractive in terms of convenience, rapidness and easy-to-use property and will surely stimulate the arrival of a new upsurge in the video conferences.

It is to be understood that a computer device with a video coding function may code video data by a video coder to obtain a video code stream corresponding to the video data, thereby improving the transmission efficiency of the video data. The video coder may be an AV1 video coder, an H.266 video coder and an AVS3 video coder, and no examples will not be given here. The video coder is required to conform to a corresponding video coding compression standard. For example, the video compression standard of the AV1 video coder is a first generation video coding standard developed by an alliance for open media (AOM).

For the convenience of understanding the process of coding the video data by the video coder, the specific process of video processing is described below. The video coding process may at least include the following step (1) to step (5):

Step (1): perform block partition on a video frame. It may be understood that after the video data is input to a video coder, the video coder may code each video frame of the video data, a certain video frame may be partitioned into several non-overlapping processing units according to the size of the video frame, and each processing unit will perform a similar compression operation. The processing unit may be called a coding tree unit (CTU) or a largest code unit (LCU). Each CTU may be continuously partitioned more finely to obtain one or more basic coding units, and the unit may be called a coding unit (CU). Each CU is the most basic element in one coding link. The following step 2 to step 4 may describe various coding modes that may be used for each CU.

Step (2): perform predictive coding on the CU. It may be understood that after the video frame is partitioned to obtain one or more coding units (CU), each of the coding units may be subjected to predictive coding, where the prediction mode of predicting the coding unit may include an intra prediction mode (predicted signals are all from an area that has been coded and reconstructed in the same image) and an inter prediction mode (predicted signals are from other images that have been coded and are different from a current image, that is, other video frames, and may be called reference frames after reference images). It is to be understood that, after an original video signal (that may be understood as an original video frame) is predicted by a selected reconstructed video signal (that may be a certain video frame which has been coded and reconstructed by a decoder side), a residual video signal (that is, a residual value) may be obtained, and a coder side in a video coding application may select the most appropriate mode of numerous possible predictive coding modes determined by a current CU and inform the decoder side in the video coding application for the predictive coding mode of the current CU, so that the decoder side decodes and reconstructs a current video frame and generates a reconstructed frame (the reconstructed frame may serve as a reference frame when the coder side performs predictive coding on a certain original video frame).

Step (3): perform transform coding and quantization on the residual video signal. Discrete cosine transform processing may be performed on the residual video signal obtained above, and the residual video signal may be transformed into a transform domain (that may be called a transform coefficient) through transform processing. Then, a signal in the transform domain may be further subjected to a lossy quantization operation, and certain information is lost, so that the quantized signal is beneficial to compressed expression. In some video coding standards, one or more transform modes may be selected for the transform processing, so the coder side is also required to select one of the transform modes for a current coding CU and inform the decoder side. The fineness of quantization is generally determined by a quantization parameter (QP). In a value of the QP is greater than a QP threshold, it is indicated that a coefficient with a larger value range will be quantized into a same output, thereby generally bringing larger distortion and lower code rate. On the contrary, when a value of the QP is less than the QP threshold, it is indicated that a coefficient with a smaller value range will be quantized into the same output, thereby bringing smaller distortion and correspondingly higher code rate.

Step (4): perform entropy coding or statistical coding on the quantized signal. It may be understood that the quantized transform domain signal obtained above may be subjected to statistical compression and coding according to the occurrence frequency of each value, and finally a compression code stream subjected to binarization (including a value 0 or a value 1) is outputted. Meanwhile, other information generated by coding, such as a selected mode and a motion vector, is also required to be subjected to entropy coding to reduce the code rate. The statistical coding is a lossy coding mode, and can effectively reduce the code rate required to express a same signal. A common statistic coding mode includes variable length coding (VLC) or content adaptive binary arithmetic coding (CABAC).

Step (5): perform a loop filtering operation. It may be understood that an image that has been coded may be subjected to inverse quantization, inverse transformation and predictive compensation operations (that may be understood as inverse operations of the step 2 to step 4 above), thereby obtaining a reconstructed decoded image. Through comparison between the reconstructed image and the original image, due to the influence of quantization, some information will be different from the original image, resulting in distortion. The reconstructed image may be subjected to a filtering operation, for example, a deblocking filter (DBF), a sample adaptive offset (SAO) or adaptive loop filter (ALF) or other filters, thereby effectively reducing the distortion degree caused by quantization. The filtered reconstructed image, as a reference for the subsequent coding of a certain video frame, is used for predicting a future signal, so the filtering operation above is also called loop filter, and a filtering operation in a coding loop.

Figure 2:
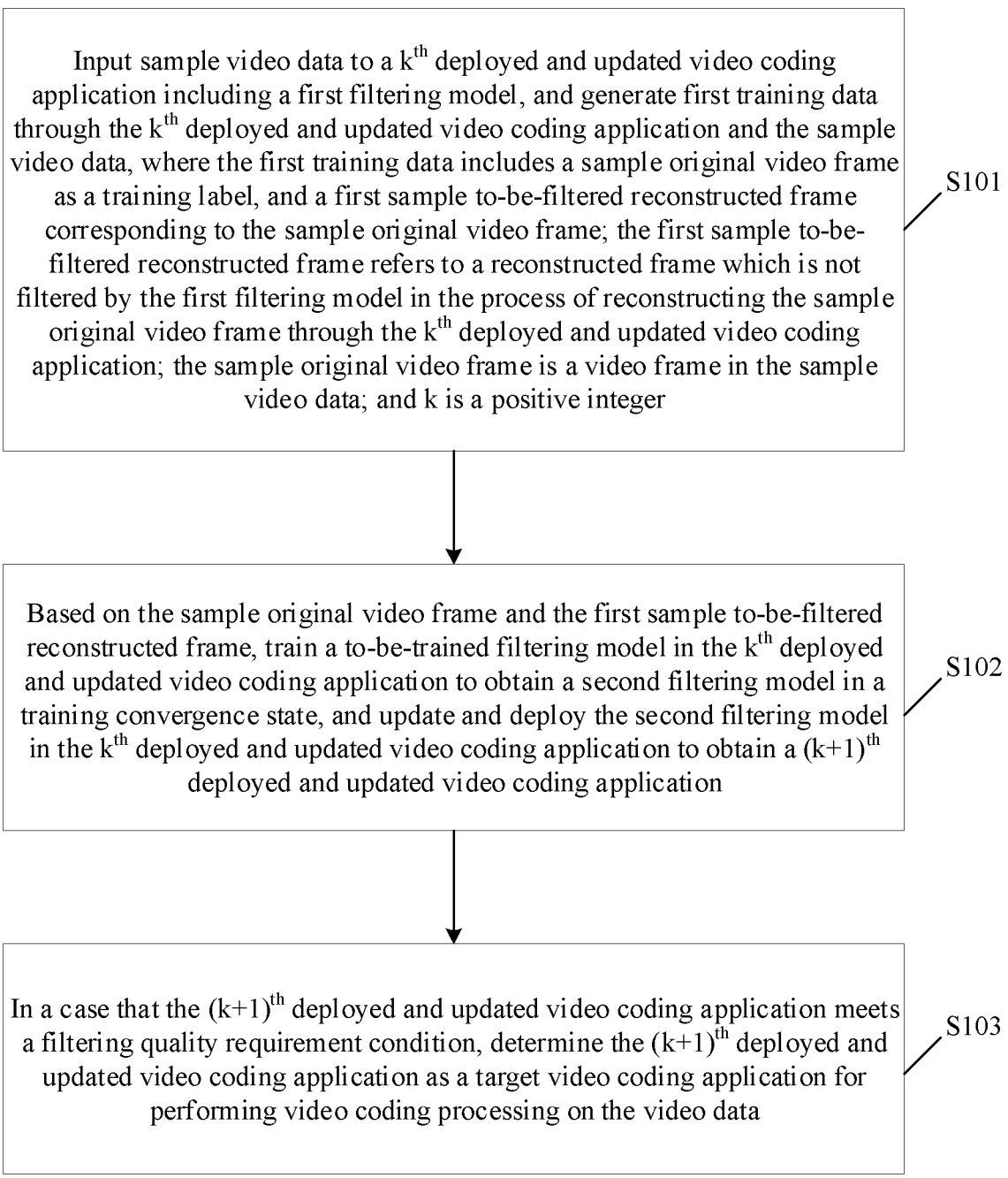
FIG. 2 is a schematic flowchart of a data processing method according to an embodiment of this disclosure.

It may be understood that to improve the video coding efficiency and improve the filtering performance of the filter deployed in the video coder, the embodiments of this disclosure provide a method for iteratively training a filter (that may be called a filtering model) and iteratively updating a video coder (that may be called a video coding application, and the specific method may be referenced to the subsequent description of the embodiments corresponding to FIG. 2.

It may be understood that the method provided by the embodiments of this disclosure may be performed by a computer device, and the computer device includes but is not limited to a terminal device or a service server. The service server may be an independent physical server, may be a server cluster composed of a plurality of physical servers or a distributed system, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

It may be understood that the computer device (such as the service server 1000, the terminal device 100a and the terminal device 100b above) may be a node in a distributed system, where the distributed system may be a blockchain system, and the blockchain system may be a distributed system formed by connecting a plurality of nodes through network communication. A peer to peer (P2P) network may be formed between the nodes, and a P2P protocol is an application layer protocol running above a transmission control protocol (TCP). In the distributed system, any form of computer device, such as the service server, the terminal device and other electronic devices, may be added to the P2P network to become one node in the blockchain system. To facilitate understanding, the concept of the blockchain will be described below. The blockchain is a novel application mode of computer technologies such as distributed data storage, P2P transmission, consensus mechanism and an encryption algorithm, and is mainly used for arranging data according to a time sequence and encrypting the data into an account book, so that the data cannot tampered and forged, and the data can be verified, stored and updated at the same time. When the computer device is a blockchain node, due to the non-tampering and forgery-proof characteristics of the blockchain, the data (such as video data, coded video data and related parameters in the coding process) in the embodiments of this disclosure may have authenticity and security, so that results obtained after related data processing is performed based on the data may be more reliable.

Further, referring to FIG. 2, FIG. 2 is a schematic flowchart of a data processing method according to an embodiment of this disclosure. The method may be performed by a terminal device (for example, any terminal device in a terminal device cluster in the embodiment corresponding to FIG. 1 above, such as a terminal device 100a). The method may further be performed by a service server (such as the service server 1000 in the embodiment corresponding to FIG. 1 above). The method may further be performed jointly by the terminal device and the service server. Taking the case where the method is performed by the service server as an example, as shown in FIG. 2, the method process may at least include the following step S101 to step S103:

Step S101: input sample video data to a kth deployed and updated video coding application including a first filtering model, and generate first training data through the kth deployed and updated video coding application and the sample video data, where the first training data includes a sample original video frame as a training label, and a first sample to-be-filtered reconstructed frame corresponding to the sample original video frame; the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer. For example, first training data is generated through a $k^{th}$ updated video coding application that includes a first filtering model, the first training data including a sample original video frame as a training label, and a first sample to-be-filtered reconstructed frame output from the $k^{th}$ updated video coding application and corresponding to the sample original video frame, k being a positive integer.

In the embodiments of this disclosure, k is an integer variable, and the value of k increases from 1; the sample video data may refer to video data for training the filtering model; the computer device (for example, the terminal device) may video data acquired by an image acquirer (for example, a camera of the terminal device) in a data transmission scenario; the video data may serve as sample video data; and the terminal device may input the sample video data into the video coding application. In other words, in the video coding application is deployed to the computer device, the computer device has a video coding function, the computer device may acquire video data through the image acquirer, and the video coding application may obtain the video data. It may be understood that the video data here may further be any video data that is required to be coded in other scenarios. For example, the video data may be video data acquired by the camera of the terminal device in an audio and video call scenario, the video data may be video data stored in a photo album of the terminal device, or the video data may be video data which is downloaded by the terminal device on the network, which is not limited here.

It may be understood that the video coding application may be used for coding the video data (for example, the sample video data) to obtain a video code stream corresponding to the video data. The video coding application coding the video data generally means that each video frame in the video data is coded. For example, the video coding application may obtain a to-be-coded video frame from the sample video data, the video frame may be called a target video frame, and the video coding application may perform image block partition on the target video frame to obtain one or more image blocks of the target video, may obtain a to-be-coded unit from the one or more image blocks and predicts the to-be-coded unit. A frame type which the target video frame belongs to may be obtained during coding processing on the target video frame, and the to-be-coded unit may be predicted based on the frame type which the target video frame belongs to during coding processing on the to-be-coded unit. The frame type may include an intra prediction type and an inter prediction type, for example, the frame type which an intra picture frame (I frame) belongs to is the intra prediction type, and the frame type which a bi-directional interpolated prediction frame (B frame) and a predictive-frame (P frame) belong to is the inter prediction type. When the frame type of the target video frame is the intra prediction type, the to-be-coded unit is predicted only with reference to an area that has been coded and reconstructed in the target video frame (the intra prediction type here may refer to a full intra prediction type, that is, all to-be-coded units in the target video frame are predicted only with reference to an area in the target video frame). When the frame type of the target video frame is the inter prediction type, the to-be-coded unit is predicted with reference to other video frames (that may be called reference video frames) which have been coded and are different from the target video frame. The reference video frame of the target video frame may be selected according to the frame type of the target video frame. For example, when the target video frame is a bidirectional prediction coding frame, the reference video frame of the target video frame may be a previous frame and a next frame. When the target video frame is a forward prediction coding frame, the reference video frame of the target video frame may be a previous frame of the target video frame. The specific implementation step of coding the video frame may be referenced to the description of the embodiment corresponding to FIG. 1 above.

Figure 3:
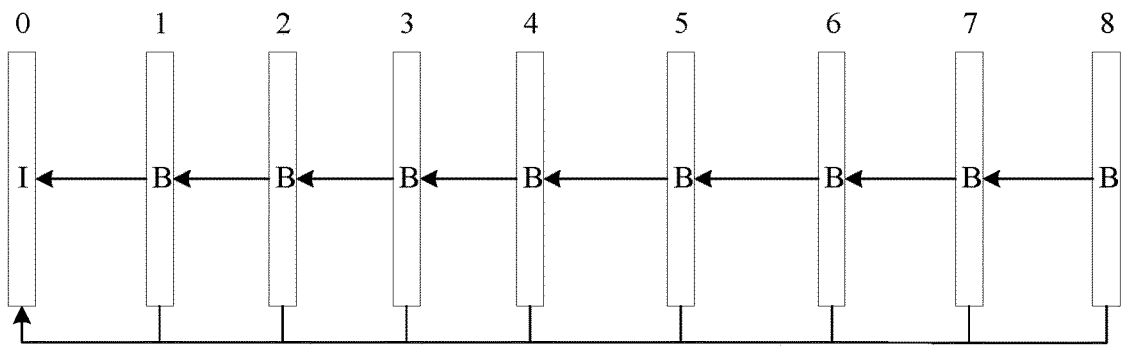
FIG. 3 is a schematic diagram of a coding reference relationship according to an embodiment of this disclosure.

For the convenience of understanding a coding dependency relationship between the video frames, referring to FIG. 3, FIG. 3 is a schematic diagram of a coding reference relationship according to an embodiment of this disclosure. In the coding configuration shown in FIG. 3, the coding sequence of the video frames is consistent with the display sequence, the arrow refers to the reference frame, and the digit is used for representing the coding sequence. That is, the 0th frame (that is, the Ith frame) may be coded preferentially, and then a B frame of the first frame is coded, where it is necessary to refer to an I frame of the 0th frame that is coded and reconstructed during coding of the B frame of the first frame. Then, a B frame of the second frame may be coded, and it is necessary to refer to the B frame of the first frame that is coded and reconstructed during coding of a B frame of the second frame, and so on until the coding processing of all the video frames is completed.

Figure 4:
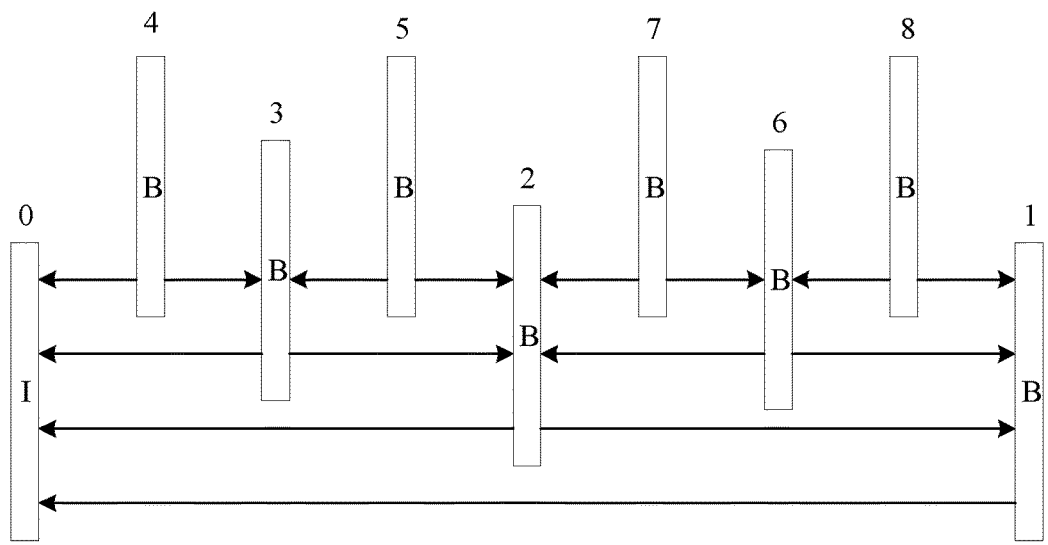
FIG. 4 is a schematic diagram of a coding reference relationship according to an embodiment of this disclosure.

For the convenience of understanding a coding dependency relationship between the video frames, referring to FIG. 4, FIG. 4 is a schematic diagram of a coding reference relationship according to an embodiment of this disclosure. In the coding configuration shown in FIG. 4, the coding sequence of the video frames is not consistent with the display sequence, the arrow refers to the reference frame, and the digit is used for representing the coding sequence. That is, the 0th frame (that is, the Ith frame) may be coded preferentially, and then a B frame of the first frame is coded, where it is necessary to refer to an I frame of the 0th frame that is coded and reconstructed during coding of the B frame of the first frame. Then, the B frame of the second frame may be coded. During coding of the B frame of the second frame, the arrow points to the 0th frame and the first frame, then it is necessary to refer to the first frame and the 0th frame that are coded and reconstructed, and so on until the coding processing of all the video frames is completed.

It may be understood from the above that during coding of the video frames according to the video coding sequence of coding configuration, for a certain video frame, a coding process shown in FIG. 1 may be used, a reference frame is determined according to the frame type of the frame, a prediction unit is obtained by performing prediction processing according to the reference frame, a residual value between the prediction unit and a to-be-coded unit is determined, a reconstructed frame (for example, the prediction unit and the residual value are added, and then filter processing is performed to obtain the reconstructed frame) corresponding to the video frame may be determined based on the prediction unit and the residual value, and the reconstructed frame may enter a reference frame queue to provide reference data for subsequent video frame coding. It is to be understood that the prediction unit may be obtained by predicting the coding unit of the video frame and the residual value may be determined based on the prediction unit, then a reconstructed image (or called a reconstructed frame before filtering) may be determined based on the prediction unit and the residual value, and the reconstructed image is filtered to obtain a reconstructed frame after filtering corresponding to the video frame.

Then it may be understood that after the sample video data is inputted to the video coding application, the video coding application may code and reconstruct each video frame to obtain a reconstructed frame corresponding to each video frame; in the embodiments of this disclosure, a reconstructed frame (that may be called a sample to-be-filtered reconstructed frame) that is not filtered may be obtained in the coding and reconstruction process, and each sample original video fame and a to-be-filtered reconstructed frame corresponding thereto may from a group of training data pair, so that multiple groups of training data pairs can be obtained; and the multiple groups training data pairs may form a training data set, and the training data set may be used for training the filtering model (that is, a model for filtering the reconstructed frame subjected to inverse transformation) in the video coding application, so that the filtering model in the video coding application can have higher filtering performance.

In the embodiments of this disclosure, when the filtering model in the video coding application is trained to be in a model convergence state, the trained filtering model may deploy and update the filtering model deployed in the video coding application (that is, the trained filtering model is deployed to the video coding application to replace the original filtering model in the video coding application); a process of deploying and updating the filtering model deployed in the video coding application may be understood as a deployment and update of the video coding application; and in the embodiments of this disclosure, new training data may be generated continuously through the updated video coding application, the new training data is used for repeatedly training the filtering model, and the video coding application is deployed and updated again based on the re-trained filtering model until the filtering performance of the video coding application can meet the filtering quality requirement condition. For example, taking the video coding application that is not deployed and updated as an example, the video coding application that is not deployed and updated includes an untrained initial filtering model, the sample video data may be inputted to the video coding application, training data corresponding to the sample video data may be generated through the video coding application, and the initial filtering model may be trained and adjusted through the training data to obtain a trained and adjusted filtering model. Then, the trained and adjusted filtering model may be updated and deployed to the video coding application to obtain the first deployed and updated video coding application. Then, new training data may be generated again through the first deployed and updated video coding application, the filtering model is trained and adjusted again based on the new training data to obtain a new trained filtering model, and then the trained and adjusted filtering model may be updated and deployed to the first deployed and updated video coding application to obtain a second deployed and updated video coding application until the filtering performance of the video coding application can meet the requirement condition.

That is, taking the case where a current video coding application is a kth deployed and updated video coding application (in which a first filtering model is deployed) and the kth deployed and updated video coding application does not meet the filtering quality requirement condition as an example, the sample video data may be inputted to the kth deployed and updated video coding application, and training data (that may be called first training data) may be generated through the kth deployed and updated video coding application, where the first training data includes a sample original video as a training label, and a sample to-be-filtered reconstructed frame (that may be called a first sample to-be-filtered reconstructed frame) corresponding to the sample original video frame. The first training data may train and adjust the first filtering model. It may be known from the above that the process of reconstructing the sample original video frame may include: performing prediction to obtain a prediction unit, determining a residual value based on the prediction unit, determining a reconstructed image (or called a reconstructed frame) based on the prediction unit and the residual value, and filtering the reconstructed image, then the sample to-be-filtered reconstructed frame may be understood as a reconstructed frame that is not filtered in the process of reconstructing the sample original video frame. One group of training data pair may be formed according to one sample original video frame and a sample to-be-filtered reconstructed frame corresponding thereto, and first training data may be formed according to multiple groups of training data pairs.

Step S102: based on the sample original video frame and the first sample to-be-filtered reconstructed frame, train a to-be-trained filtering model in the kth deployed and updated video coding application to obtain a second filtering model in a training convergence state, and update and deploy the second filtering model in the kth deployed and updated video coding application to obtain a (k+1)th deployed and updated video coding application. For example, a second filtering model in the $k^{th}$ updated video coding application is trained based on the sample original video frame and the first sample to-be-filtered reconstructed frame to obtain the second filtering model in a training convergence state. The second filtering model in the training convergence state is integrated into the $k^{th}$ updated video coding application to obtain a $(k+1)^{th}$ updated video coding application.

In the embodiments of this disclosure, it may be known from the above that during coding of the video frame, a frame type which each video frame belongs to may be determined first, and then a to-be-coded unit is subjected to coding processing such as prediction processing based on the frame type. In the embodiments of this disclosure, the filtering model in the video coding application may be configured to filter a reconstructed frame belonging to an intra prediction type (for example, a reconstructed frame corresponding to an I frame), or may be configured to filter a reconstructed frame belonging to an inter prediction type (a reconstructed frame corresponding to a B frame). That is, the first filtering model above may be a filtering model corresponding to the I frame and the B frame jointly. In this case, a to-be-filtered filtering model may refer to the first filtering model, and the first filtering model may be trained based on first training data to obtain a second filtering model in a training convergence state. Then, the first filtering model in the kth deployed and updated video coding application may be replaced with the second filtering model, so that a (k+1)th deployed and updated video coding application can be obtained.

The specific implementation manner of: based on the sample original video frame and the first sample to-be-filtered reconstructed frame, training a to-be-trained filtering model in the kth deployed and updated video coding application to obtain a second filtering model in a training convergence state, may be: the first sample to-be-filtered reconstructed frame may be inputted to the first filtering model, and a sample filtering reconstructed frame (sample filtered reconstructed frame) corresponding to the first sample to-be-filtered reconstructed frame may be outputted through the first filtering model; then, an error value between the sample filtering reconstructed frame and the sample original video frame may be determined, and a model parameter of the first filtering model may be adjusted through the error value to obtain a first filtering model with an adjusted model parameter; and when the first filtering model with the adjusted model parameter meets a model convergence condition, the first filtering model with the adjusted model parameter may be determined as a second filtering model in a training convergence state.

The model convergence condition here may mean that the number of training and adjusting times reaches the number of adjusting times, or may mean that the image quality of a filtering image outputted by the adjusted first filtering model meets the quality requirement condition. For example, taking the case where the model convergence condition is that the number of adjusting times reaches the number of preset adjusting times as an example, assuming that the number of preset adjusting times is 10, after the model parameter is adjusted once based on the error value generated for the first time, the first sample to-be-filtered reconstructed frame may be inputted again to a first filtering model that is adjusted once, a sample filtering reconstructed frame is outputted again, a new error value is generated again, and the model parameter is adjusted again until the model parameter is adjusted for 10 times; and at this time, the first filtering model which is adjusted for 10 times may be determined to meet the model convergence condition (that is, in a training convergence state).

The specific implementation manner of determining the error value between the sample filtering reconstructed frame and the sample original video frame may be: a loss function corresponding to the kth deployed and updated video coding application may be obtained; then, original image quality corresponding to the sample original video frame may be obtained based on the loss function, and the original image quality serves as an image quality label; and then, filtering image quality (filtered image quality) corresponding to the sample filtering reconstructed frame may be obtained based on the loss function, and the error value between the sample filtering video frame and the sample original video frame may be determined through the loss function, the image quality label and the filtering image quality.

It may be understood that in the embodiments of this disclosure, each iterative training of the filtering model is performed independently, that is, after the training data is generated, the loss function of the filtering model trained based on the training data may be different independent loss functions. For example, during training of the filtering model based on training data generated for the first time, the error value may be determined by using a loss function L1 (an absolute value loss function), and the model parameter may be adjusted based on the error value; during training of the filtering model based on training data generated for the second time, the error value may be determined by using a loss function L2 (a square error loss function), and the model parameter may be adjusted based on the error value; during training of the filtering model based on training data generated for the third time, one error value may be determined by using the loss function L1, one error value may be determined by using the loss function L2, the model parameter may be adjusted based on the error value of L1, and then adjustment is continued based on the error value of L2 and L1 adjustment; and certainly, during training of the filtering model by training data generated subsequently, and the model parameter may be adjusted based on a total error value obtained by adding the error value of L1 and the error value of L2. The loss function of each iteration is not limited here.

Each loss function in the embodiments of this disclosure may include an absolute value loss function L1 and a square error loss function L2, and may further be any other loss function that can determine an error between a label and output data. The loss function may include a cross entropy loss function, a mean square error loss function, a logarithm loss function, an index loss function and the like. Taking the case where the loss function corresponding to the kth deployed and updated video coding application includes the absolute value loss function and the square error loss function as an example, the specific implementation manner of determining the error value between the sample filtering reconstructed frame and the sample original video frame through the loss function, the image quality label and the filtering image quality may be: a first error value between the sample filtering reconstructed frame and the sample original video frame may be determined through the square error loss function, the image quality label and the filtering image quality; then, a second error value between the sample filtering reconstructed frame and the sample original video frame may be determined through the absolute value loss function, the image quality label and the filtering image quality; and then, the first error value and the second error value may be subjected to operation (for example, addition operation), and the result obtained through operation (for example, the addition result) may be determined as the error value between the sample filtering reconstructed frame and the sample original video frame.

Step S103: when the (k+1)th deployed and updated video coding application meets a filtering quality requirement condition, determine the (k+1)th deployed and updated video coding application as a target video coding application for performing video coding processing on the video data. For example, the $(k+1)^{th}$ updated video coding application is determined as a target video coding application for performing video coding processing in response to a determination that the $(k+1)^{th}$ updated video coding application meets a filtering quality requirement condition.

In the embodiments of this disclosure, after the video coding application is deployed and updated at each time, the video coding application may be detected to determine whether the filtering quality requirement condition is met, and when it is determined that the filtering quality requirement condition is met, the video coding application may not be iteratively updated any more, and the video coding application may be put into use (for example, may serve as a target video coding application to perform video coding processing on the subsequent video data). Taking the case where the (k+1)th deployed and updated video coding application is detected as an example, the specific implementation manner of detecting (or evaluating) the video coding application may be: the sample video data may be inputted into the (k+1)th deployed and updated video coding application, and to-be-detected filtering video data (filtered video data) may be outputted through the (k+1)th deployed and updated video coding application; then filtering video quality (filtered video quality) corresponding to the to-be-detected filtering video data, and original video quality corresponding to the sample video data may be obtained; and the (k+1)th deployed and updated video coding application may be detected (evaluated) according to the filtering video quality and the original video quality.

The specific implementation manner of detecting the (k+1)th deployed and updated video coding application according to the filtering video quality and the original video quality may be: difference video quality between the filtering video quality and the original video quality may be determined; when the difference video quality is less than a difference quality threshold, it may be determined that the second video coding application meets the filtering quality requirement condition; and when the difference video quality is greater than a difference quality threshold, it may be determined that the second video coding application does not meet the filtering quality requirement condition.

It may be understood that each filtering reconstructed frame (a reconstructed frame filtered by the second filtering model) may outputted by the (k+1)th deployed and updated video coding application may be obtained, the filtering image quality of the filtering reconstructed frame may be compared with the original image quality of the corresponding original video frame, and when the difference quality between the filtering image quality of the filtering reconstructed frame and the original image quality of the corresponding original video frame is less than a preset threshold, it may be determined that the video frame processed by the model meets the filtering requirement after the second filtering model is deployed to the video coding application.

It may be understood that when the (k+1)th deployed and updated video coding application does not meet the filtering quality requirement condition, new training data may be generated again based on the (k+1)th deployed and updated video coding application, and the second filtering model is trained again based on the new training data to obtain a new filtering model (such as a third filtering model). Then, the second filtering model deployed in the (k+1)th deployed and updated video coding application may be updated as the third filtering model to obtain a (k+2)th deployed and updated video coding application, and at this time, the application may be detected again until the video coding application meets the filtering quality requirement condition, so that a target video coding application can be obtained.

Figure 5:
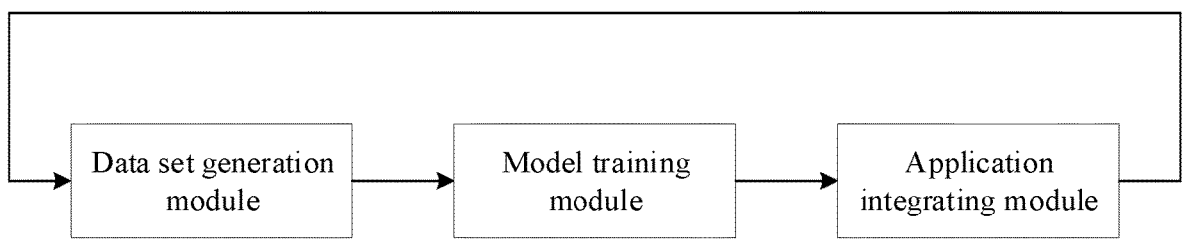
FIG. 5 is a system architecture diagram of iterative training according to an embodiment of this disclosure.

For the convenience of understanding the specific process of training the model and iteratively updating the application in the embodiments of this disclosure, referring to FIG. 5, FIG. 5 is a system architecture diagram of iterative training according to an embodiment of this disclosure. As shown in FIG. 5, the system architecture may include a data set generation module, a model training module and an application integrating module. To facilitate understanding, each module will be described below.

The data set generation module is mainly configured to generate a training data set (that may be called training data). It is to be understood that video data may be coded and reconstructed through a video coding application, and in the coding and reconstructing process, the data set generation module may take a to-be-filtered reconstructed frame (that is, an unfiltered reconstructed frame) and an original video frame corresponding thereto as a group of training data pair, thereby obtaining training data including multiple groups of data pairs.

The model training module is mainly configured to train a filtering model. It is to be understood that the training data generated by the data set generation module above may be transmitted to the model training module, and in the model training module, the filtering model may be trained based on the training data, so that the filtering model may meet a training target.

The application integrating module is mainly configured to integrate and deploy the trained filtering model into the video coding application. It is to be understood that the application integrating module may deploy and integrate the trained filtering model above into the video coding application, and at this time, video data may be inputted into the video coding application in which the trained filtering mode is integrated to detect whether the video coding application can meet the filtering requirement condition (that is, detect whether the filtering performance of the application can meet a preset requirement condition) in practical application. When the video coding application meets the filtering requirement condition, the video coding application may be put into use; and when the video coding application does not meet the filtering requirement condition, the data set generation module may be used again, a training data set is generated again based on the new video coding application, the filtering model is trained again based on the new training data set, application integration is performed, and actual filtering processing is performed until the video coding application meets the filtering requirement condition. That is, when the trained filtering model meets a training target (that is, when the filtering requirement condition is meet), after the filtering model is integrated and deployed into the video coding application, since different reference relationships are present in a coding frame of an inter prediction type (an inter prediction coding frame), then a reconstructed frame before filtering corresponding to the inter prediction coding frame will be inconsistent with the reconstructed frame before filtering in the training process, the training is inconsistent with the test result, and the filtering performance of the filtering model in the video coding application is not an expected effect. In the embodiments of this disclosure, the training data set is generated again through each deployed and updated video coding application, the filtering model is trained again and is integrated into the video coding application again to perform an iterative training process of actual filtering processing, so that the consistency of training and test can be improved continuously until the filtering model in the video coding application meets the filtering requirement condition, thereby improving the coding efficiency.

For the generation of a training data set by the data set generation module, the training data set may be generated by software in which a filter with equivalent performance is integrated. That is, for a current filtering model, training data may be generated by software in which the filter with the performance equivalent to that of the current model is integrated, and the current filtering model is trained based on the training data. For example, before the first iterative updating of the application, the training data set may be generated by the filter (that is, a related filter, such as a filter determining a filtering parameter based on manual experience) with the performance equivalent to that of the initial untrained filtering model, and the training data set is used to complete the model training process (that is, the training data set is used to train the initial untrained filtering model) in the first iterative updating.

In the embodiments of this disclosure, sample video data may be inputted to the kth (such as the first, the second, the third, . . . ) deployed and updated video coding application (the video coding application in which a first filtering model is deployed), and first training data corresponding to the sample video data may be outputted through the kth deployed and updated video coding application; the first filtering model may be trained again based on the first training data to obtain a second filtering model, and the second filtering model may deploy and update the kth deployed and updated video coding application again, so that the (k+1)th deployed and updated video coding application can be obtained; and at this time, the (k+1)th deployed and updated video coding application may be detected, when the (k+1)th deployed and updated video coding application meets a filtering quality requirement condition, the (k+1)th deployed and updated video coding application may be determined as a target video coding application for performing video coding processing on the video data. It is to be understood that the filtering model (for example, the first filtering model), is deployed to the video coding application, that is, one deployment and updating of the video coding application, the filtering model may be trained based on a machine learning method after the training data is generated based on the video coding application, and then the trained filtering model may be deployed and updated to the video coding application to obtain an updated video coding application; and subsequently, in the embodiments of this disclosure, new training data may be generated continuously based on the updated video coding application, the filtering model may be trained again based on the new training data, and then the trained filtering model may be deployed and updated to the video coding application again to obtain a video coding application updated again until the video coding meets the filtering quality requirement condition.

That is, in the embodiments of this disclosure, after the filtering model is deployed to the video coding application, the video coding application can be iteratively updated, the training process of the filtering model is repeated by updating the training data, and the video coding application is continuously deployed and updated, so that the consistency of the training effect and the test effect of the filtering model can be improved, the coding efficiency can be enhanced, the filtering performance of the filtering model deployed in the video coding application can be improved without depending on manual experience, and the distortion degree of the coded video can be reduced. In conclusion, the embodiments of this disclosure can improve the filtering performance, reduce the image distortion degree of the coded video and enhance the coding efficiency.

It may be known from the above that during coding of the video frame, a frame type which each video frame belongs to may be determined first, and then a to-be-coded unit is subjected to coding processing such as prediction processing based on the frame type. Since the prediction mode of the inter prediction coding frame (in the coding process, each video frame may be called a coding frame, and the inter prediction coding frame may be understood as a coding frame with the frame type being the inter prediction type, such as a B frame) is an inter prediction mode, prediction may be performed with reference to other reconstructed frames, and the prediction accuracy is generally higher. The prediction mode of the intra prediction coding frame (that may be understood as a coding frame with a frame type being an intra prediction type, such as an I frame) is an intra prediction mode with reference to other area of this frame, and the prediction accuracy is generally lower than that of the inter prediction coding frame. That is, for the filtering model, the image features before filtering of the intra prediction coding frame and the inter prediction coding frame (that may be understood as an unfiltered reconstructed frame (that may be called a to-be-filtered reconstructed frame) in the corresponding process in FIG. 1) are different obviously, then when the same filtering model is used for uniform filtering processing, the quality of the filtered image will be affected. To make the filtering effect of the intra prediction coding frame and the inter prediction coding frame better, that is, to improve the quality of the filtered image, in the embodiments of this disclosure, different filtering models may be trained for the intra prediction coding frame and the inter prediction coding frame, and the to-be-filtered reconstructed frame corresponding to the intra prediction coding frame and the inter prediction coding frame is filtered by different filtering models. For example, the to-be-filtered reconstructed frame corresponding to the intra prediction coding frame is filtered by an intra filtering model, and the to-be-filtered reconstructed corresponding to the inter prediction coding frame is filtered by an inter filtering model.

It may be understood that during filtering of the intra prediction coding frame and the inter prediction coding frame by different filtering models, the video coding application in the embodiments of this disclosure may include an intra filtering model for filtering the reconstructed frame (a to-be-filtered reconstructed frame corresponding to the intra prediction coding frame, such as a reconstructed frame corresponding to an I frame) belonging to the intra prediction type, and an inter filtering model for filtering a reconstructed frame (a to-be-filtered reconstructed frame corresponding to the inter prediction coding frame, such as a reconstructed frame corresponding to a B frame) belonging to the inter prediction type. In the embodiments of this disclosure, a to-be-trained model may be determined between the intra filtering model and the inter filtering model, and the to-be-trained model is trained based on training data. For example, taking the case above where the first filtering model deployed in the kth deployed and updated video coding application includes a first intra filtering model (the first intra filtering model is obtained by training the initial intra filtering model in the (k−1)th deployed and updated video coding application) for filtering the to-be-filtered reconstructed frame belonging to the intra prediction type, and the kth deployed and updated video coding application further includes an untrained initial inter filtering model (the initial inter filtering model is configured to filter the to-be-filtered reconstructed frame belonging to the inter prediction type) as an example, the embodiments of this disclosure may determine the to-be-trained filtering model in the kth deployed and updated video coding application as the initial inter filtering model and the first inter filtering model, and may also determine the to-be-trained filtering model only as the initial inter filtering model.

The untrained initial inter filtering model included in the kth deployed and updated video coding application is described below.

Exemplarily, assuming that k=K1, the inter filtering model is introduced into the video coding application, then the untrained initial inter filtering model included in the K1th deployed and updated video coding application refers to a completely untrained initial inter filtering model; and an untrained initial inter filtering model included in the (K1+1)th deployed and updated video coding application refers to an inter filtering model obtained after the K1th training, where K1 represents a constant, for example, taking K1=3 as an example, that is, in the third iterative training process, the completely untrained initial inter filtering model is introduced into the video coding application, then an untrained initial inter filtering model included in the fourth deployed and updated video coding application refers to an inter filtering model obtained after the third training.

Figure 6:
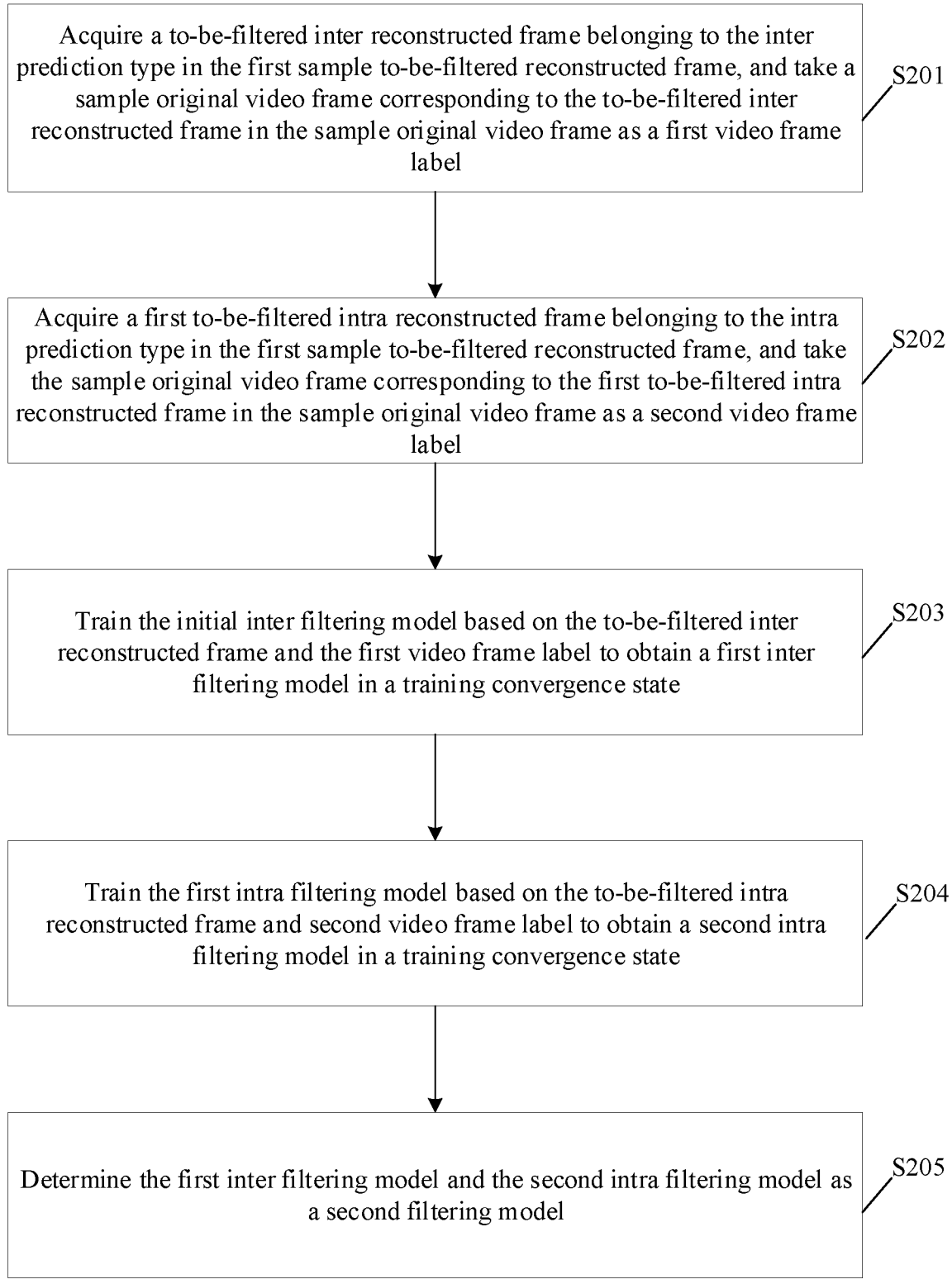
FIG. 6 is a schematic flowchart of a training filtering model according to an embodiment of this disclosure.

For the convenience of understanding, referring to FIG. 6, FIG. 6 is a schematic flowchart of a training filtering model according to an embodiment of this disclosure. The process is a specific process of taking the case where the to-be-trained filtering model in the kth deployed and updated video coding application includes an initial inter filtering model and a first intra filtering model as an example, and training the to-be-trained filtering model in the kth deployed and updated video coding application based on the sample original video frame and the first sample to-be-filtered reconstructed frame to obtain a second filtering model in a training convergence state. As shown in FIG. 6, the process may at least include the following steps S201 to S205:

Step S201: acquire a to-be-filtered inter reconstructed frame belonging to the inter prediction type in the first sample to-be-filtered reconstructed frame, and take a sample original video frame corresponding to the to-be-filtered inter reconstructed frame in the sample original video frame as a first video frame label.

Specifically, it may be known from the above that various sample original video frames and sample to-be-filtered reconstructed frames corresponding thereto may be included in the training data generated in the video coding application; and in the process of coding and reconstructing various sample original video frames, it is necessary to determine a frame type which each sample original video frame belongs to, and prediction is performed based on the frame type, so the obtained sample to-be-filtered reconstructed frame corresponds to different frame types. For example, in the process of coding and reconstructing the sample original video frame a, the frame type of the coding frame of the sample original video frame a is determined as the intra prediction type, then the frame type of the reconstructed frame corresponding to the sample original video frame a may also be understood as the intra prediction type. In the embodiments of this disclosure, the intra filtering model may be trained by the video frame with the frame type being the intra prediction type, and the inter filtering model may be trained by the video frame with the frame type being the inter prediction type. Then when the to-be-trained filtering model in the kth deployed and updated video coding application includes the initial inter filtering model and the first intra filtering model, for the initial inter filtering model, the to-be-filtered reconstructed (that may be called a to-be-filtered inter reconstructed frame) belonging to the inter prediction type may be obtained in the first training data, and the sample original video frame corresponding to the to-be-filtered inter reconstructed in the sample original video frame may be taken as a first video frame label.

Step S202: acquire a first to-be-filtered intra reconstructed frame belonging to the intra prediction type in the first sample to-be-filtered reconstructed frame, and take the sample original video frame corresponding to the first to-be-filtered intra reconstructed frame in the sample original video frame as a second video frame label.

Specifically, similarly, for the first intra filtering model, the reconstructed frame (that may be the first to-be-filtered intra reconstructed frame) belonging to the intra prediction type may be acquired in the first training data, and the sample original video frame corresponding to the first to-be-filtered intra reconstructed frame in the sample original video frame may be taken as the second video frame label.

Step S203: train the initial inter filtering model based on the to-be-filtered inter reconstructed frame and the first video frame label to obtain a first inter filtering model in a training convergence state.

Specifically, the initial inter filtering model may be trained and adjusted through the to-be-filtered inter reconstructed frame and the first video frame label corresponding thereto to obtain an inter filtering model (that may be called a first inter filtering model) in a training convergence state.

Step S204: train the first intra filtering model based on the to-be-filtered intra reconstructed frame and the second video frame label to obtain a second intra filtering model in a training convergence state.

Specifically, the first intra filtering model may be trained and adjusted through the first to-be-filtered intra reconstructed frame and the second video frame label corresponding thereto to obtain an intra filtering model (that may be called a second intra filtering model) in a training convergence state.

Step S205: determine the first inter filtering model and the second intra filtering model as a second filtering model.

Specifically, the second intra filtering model and the first inter filtering model may serve as the second filtering model. The specific training process of each filtering model may be referenced to the description of the process of training the filtering model in the embodiment corresponding to FIG. 3 above, and details are not described herein again.

In the embodiment corresponding to FIG. 2 above, when the first filtering model is a filtering model which the inter prediction coding frame and the intra prediction coding frame jointly correspond to, the specific process of updating and deploying the second filtering model in the kth deployed and updated video coding application to obtain the (k+1)th deployed and updated video coding application may be to only replace the first filtering model with the second filtering model. Then in this embodiment, when the to-be-trained filtering model in the kth deployed and updated video coding application includes the initial inter filtering model and the first intra filtering model, the specific implementation manner of updating and deploying the second filtering model in the kth deployed and updated video coding application to obtain the (k+1)th deployed and updated video coding application may be as follows: the first intra filtering model in the kth deployed and updated video coding application may be replaced and updated into the second intra filtering model; and the initial inter filtering model in the kth deployed and updated video coding application may be replaced and updated into the first inter filtering model. That is, the two trained models are respectively updated and replaced.

It may be understood that when the kth deployed and updated video coding application includes the initial inter filtering model and the first intra filtering model, and the initial inter filtering model is an untrained filtering model, the to-be-trained model in the kth deployed and updated video coding application may only be determined as the initial inter filtering model, that is, the first intra filtering model is not trained again. After the initial inter filtering model is trained and adjusted through the to-be-filtered inter reconstructed frame and the first video frame label in the first training data above to obtain the first inter filtering model, the first inter filtering model may be determined as the second filtering model. Then, the initial inter filtering model in the kth deployed and updated video coding application may be replaced with the first inter filtering model to obtain the (k+1)th deployed and updated video coding application may In the subsequent process of iteratively updating the video coding application, new training data may be generated based on the (k+1)th deployed and updated video coding application, the first intra filtering model and the first inter filtering model above are trained together based on the new training data, and the (k+1)th deployed and updated video coding application is deployed and updated based on the trained intra or inter filtering model.

Figure 7:
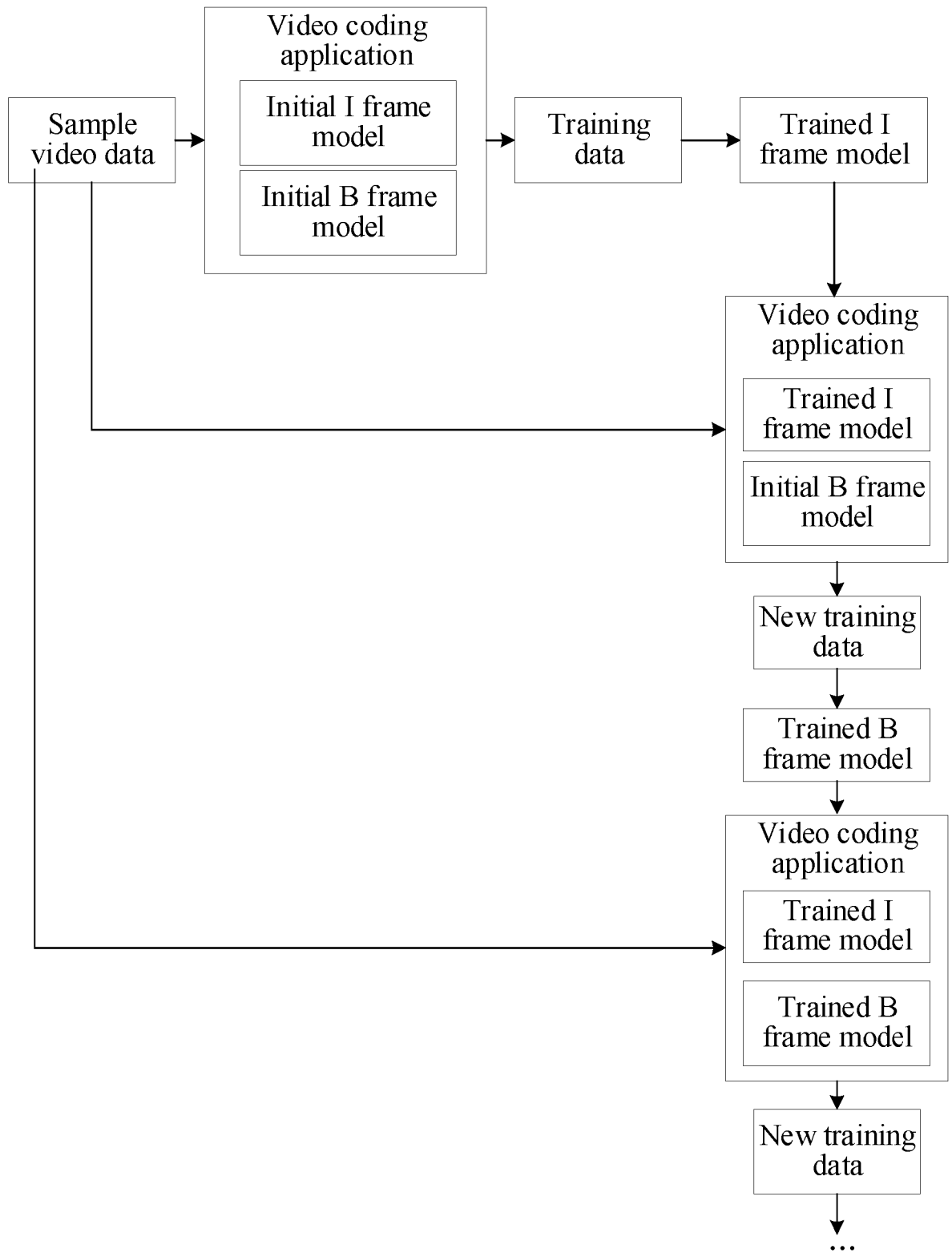
FIG. 7 is a scenario schematic diagram of model training according to an embodiment of this disclosure.

It may be understood that for the case that the intra prediction coding frame (that is, the coding frame or video frame belonging to the intra prediction type, such as an I frame) has one type of model (that is, an intra filtering model, such as an I frame model) and the inter prediction coding frame (that is the coding frame or video frame belonging to the inter prediction type, such as a B frame) has one type of model, the filtering model may be trained by the process shown in FIG. 6. For the convenience of understanding, referring to FIG. 7, FIG. 7 is a scenario schematic diagram of model training according to an embodiment of this disclosure. As shown in FIG. 7, taking the case where the intra filtering model includes an I frame model and the inter filtering model includes a B frame model as an example, in this case, the process of iteratively training the model may include the following steps (1) to (4):

Step (1): when the video coding application includes the initial untrained I frame model and B frame model, input the sample video data to the video coding application, and output training data by the video coding application.

Step (2): take the initial I frame model in the video coding application as a to-be-trained model, and train the I frame model based on the training data (train the I frame based on an I frame original video frame and an I frame to-be-filtered reconstructed frame in the training data) to obtain an I frame model in a training convergence state (that is, a trained I frame model). Then, the initial I frame model in the video coding application may be replaced with the trained I frame model, and the initial B frame model is kept unchanged, so a first deployed and updated video coding application may be obtained.

Step (3): input the sample video data to the first deployed and updated video coding application, and output new training data through the first deployed and updated video coding application.

Step (4): take the initial B frame model in the first deployed and updated video coding application as a to-be-trained model, train the B frame model based on the new training data (train the B frame model based on a B frame original video frame and a B frame to-be-filtered reconstructed frame in the training data) to obtain a B frame model in a training convergence state (that is, a trained B frame model), and replace the initial B frame model in the first deployed and updated video coding application with the trained B frame model to obtain a second deployed and updated video coding application. Here, the trained I frame model may be trained while the B frame model is trained based on the new training data, the trained B frame model and the I frame model that is trained again are obtained, and the I frame model and the B frame model in the video coding application are respectively updated and replaced.

Step (5): input the sample video data to the second deployed and updated video coding application, and output new training data again through the second deployed and updated video coding application. At this time, the I frame model and the B frame model in the first deployed and updated video coding application may be trained again based on new training data to obtain a trained I frame model and a trained B frame, and the models in the second deployed and updated video coding application are respectively replaced and updated by the trained I frame model and the trained B frame model to obtain a third deployed and updated video coding application.

After the video coding application is deployed and updated at each time, the application may be detected to determine whether the application meets the filtering requirement condition; and when the filtering requirement condition is not met, a new training data set is generated again, the model is trained again based on the new training data set, and the video coding application is deployed and updated again based on the trained mode until the video coding application meets the filtering requirement condition.

Figure 8:
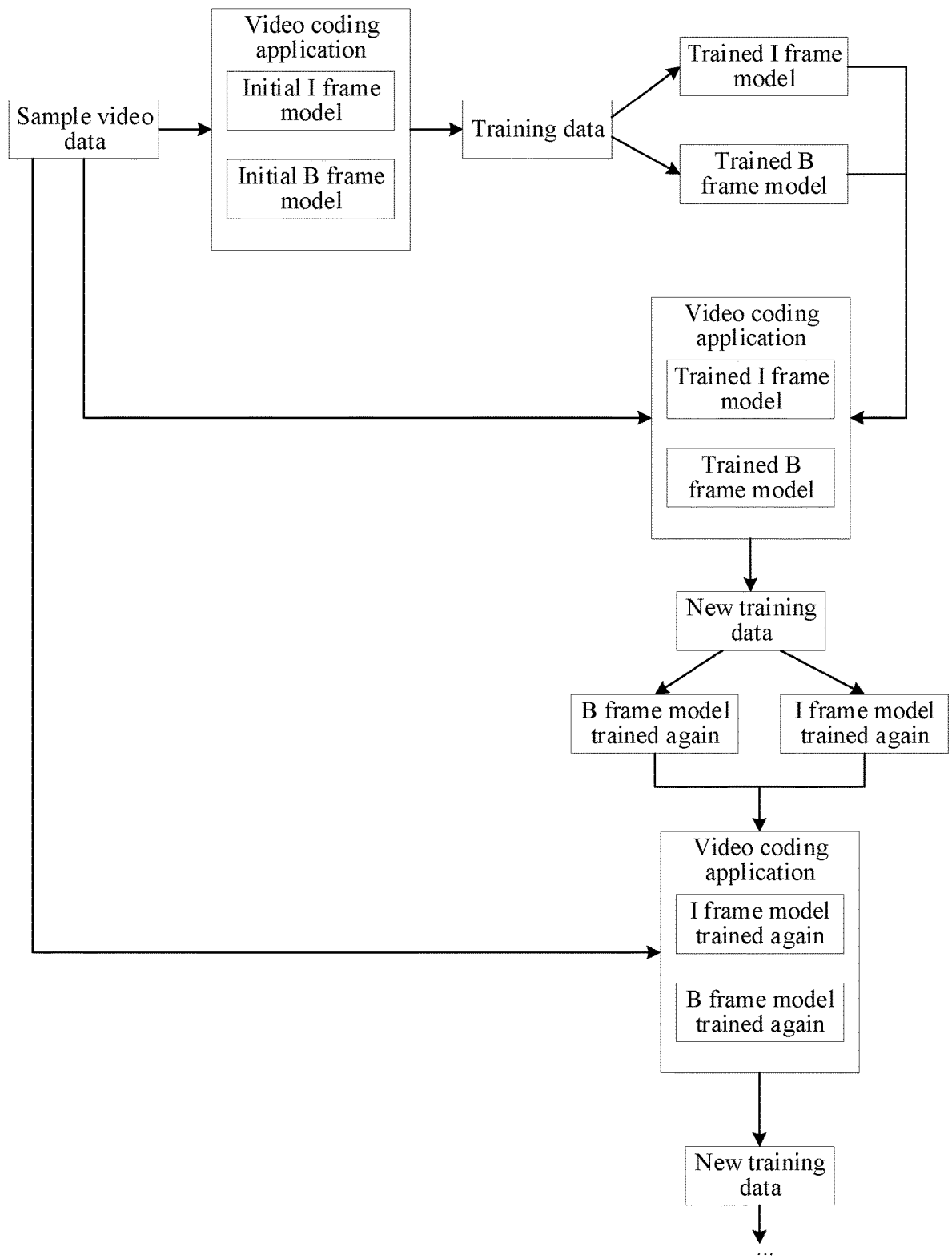
FIG. 8 is a scenario schematic diagram of model training according to an embodiment of this disclosure.

In an embodiment, the to-be-trained filtering model in the deployed and updated video coding application may include a first inter filtering model and a first intra filtering model; and the first inter filtering model is obtained by training an initial inter filtering model in a (k−1)th deployed and updated video coding application, that is, the embodiments of this disclosure may train the initial inter filtering model and the initial intra filtering model together to obtain the first inter filtering model and the first intra filtering model, and the initial inter filtering model and the initial intra filtering model in the (k−1)th deployed and updated video coding application are respectively updated and replaced to obtain the kth deployed and updated video coding application including the first inter filtering model and the first intra filtering model. For the convenience of understanding, referring to FIG. 8, FIG. 8 is a scenario schematic diagram of model training according to an embodiment of this disclosure. As shown in FIG. 8, taking the case where the intra filtering model includes an I frame model and the inter filtering model includes a B frame model as an example, in this case, the process of iteratively training the model may include the following steps (81) to (84):

Step (81): when the video coding application includes the initial untrained I frame model and B frame model, input the sample video data to the video coding application, and output training data by the video coding application.

Step (82): take the initial I frame model in the video coding application as a to-be-trained model, train the I frame model based on the trained data (train the I frame model based on an I frame original video frame and an I frame to-be-filtered reconstructed frame in the training data), and train the B frame model based on the training data (train the B frame model based on a B frame original video frame and a B frame to-be-filtered reconstructed frame in the training data) to obtain a B frame model in a training convergence state (that is, a trained B frame model). Then, the initial I frame model in the video coding application may be replaced with the trained I frame model, and the initial B frame model may be replaced with the trained B frame model, so the first deployed and updated video coding application can be obtained.

Step (83): input the sample video data to the first deployed and updated video coding application, and output new training data through the first deployed and updated video coding application.

Step (84): take the I frame model and the B frame model in the first deployed and updated video coding application as to-be-trained models (or only take the B frame model as a to-be-trained model), train the I frame model and the B frame model based on new training data to obtain an I frame model and a B frame model in a training convergence state, and replace and update the models in the first deployed and updated video coding application correspondingly to obtain a second deployed and updated and video coding application.

After the video coding application is deployed and updated at each time, the application may be detected to determine whether the application meets the filtering requirement condition; and when the filtering requirement condition is not met, a new training data set is generated again, the model is trained again based on the new training data set, and the video coding application is deployed and updated again based on the trained mode until the video coding application meets the filtering requirement condition.

It is to be understood that according to the above, during coding of the video frame, a frame type which each video frame belongs to may be determined first, and then a to-be-coded unit is subjected to coding processing such as prediction processing based on the frame type. The inter prediction coding frame (such as the B frame) requires other reconstructed frames as reference for prediction coding, and the coupling relationship of the reference relationship of the inter prediction coding frame affects the consistency between training and actual testing. That is, even if the trained filtering model is in a model convergence state to achieve the training target, but after the filtering model is deployed to the video coding application, since the inter prediction coding frame requires forward reference or bidirectional reference, in the actual testing process, the filtered reconstructed frame outputted by the video coding application is not the expected filtering effect. That is, the results of training and testing are not equal. For example, a reference frame corresponding to a certain B frame is a filtered reconstructed frame of the previous I frame; after the filtering model of the trained I frame and the filtering model of the trained B frame are deployed and updated to the video coding application, the quality of the filtered reconstructed frame of the I frame will be improved; due to the improved quality of the filtered reconstructed frame of the I frame, the prediction result of the B frame will be improved, that is, the feature before filtering of the B frame will be improved; and after processing of the filtering model of the B frame, the filtering effect of the reconstructed frame of the B frame is not the filtering effect in the training process. That is, the training process and the testing process are not equal. By an iterative training method provided by the embodiments of this disclosure, the B frame model or the I frame model are repeatedly trained by updating the training data set, so that the consistency between training and testing of the B frame can be improved, the coding efficiency and the filtering performance of the video coding application can be enhanced, and the distortion degree of the coded video can be reduced.

In the embodiments of this disclosure, the inter filtering model is repeatedly trained by updating the training data set, so that the consistency between training and testing of the prediction coding frame can be improved, thereby improving the coding efficiency and the filtering performance of the video coding application, and reducing the distortion degree of the coded video.

Further, it may be understood that the embodiment corresponding to FIG. 6 above may be understood as a model training process of only one type of filtering model (that is, an inter filtering model) which the prediction coding frame corresponds to; in fact, some frames in the inter prediction coding frame may be filtered by one type of filtering model (for example, taking B-1, B-3 and B-5 frames as an example, filtering may be performed by a B-1 model), some frames may be filtered by another type of filtering model (for example, taking B-2, B-4 and B-6 frames as an example, filtering may be performed by a B-2 model), that is, the inter filtering model may include two or more than two types of inter filtering models (various inter filtering models may refer to models with different network structures and model parameters; and certainly, various inter filtering models may further refer to models with the same network structure and different model parameters); herein, for the convenience of distinguishing, the inter prediction type (such as the B frame type) may be subdivided into a first inter prediction type (such as B-1, B-3 and B-5 frame types) and a second inter prediction type (such as B-2, B-4 and B-6 frame types), and a certain type of inter filtering model is called a type inter filtering model. For example, the inter filtering model corresponding to the first inter prediction type may be called a first type inter filtering model, and the inter filtering model corresponding to the second inter prediction type may be called a second type inter filtering type.

It may be understood that during filtering of different inter prediction coding frames by different type inter filtering models, the video coding application in the embodiments of this disclosure may include an intra filtering model for filtering the reconstructed frame (a to-be-filtered reconstructed frame corresponding to the intra prediction coding frame, such as a reconstructed frame corresponding to an I frame) belonging to the intra prediction type, a first type inter filtering model for filtering a reconstructed frame belonging to the first inter prediction type, and a second type inter filtering model for filtering a reconstructed frame belonging to the second inter prediction type. In the embodiments of this disclosure, a to-be-trained model may be determined between the intra filtering model and different type inter filtering models, and the to-be-trained model is trained based on training data. For example, taking the case where the first filtering model includes a first intra filtering model (the first intra filtering model is obtained by training the initial intra filtering model in the (k−1)th deployed and updated video coding application) for filtering the to-be-filtered reconstructed frame belonging to the intra prediction type, and the kth deployed and updated video coding application further includes an untrained first type initial inter filtering model and an untrained second type initial inter filtering model (the first type initial inter filtering model is configured to filter the to-be-filtered reconstructed frame belonging to the first inter prediction type, and the second type initial inter filtering model is configured to filter the to-be-filtered reconstructed frame belonging to the second inter prediction type) as an example, the embodiments of this disclosure may determine the to-be-trained filtering model in the kth deployed and updated video coding application as the first intra filtering mode and the untrained first type initial inter filtering model, or may only determine the to-be-trained filtering model as the untrained first type initial inter filtering model.

Figure 9:
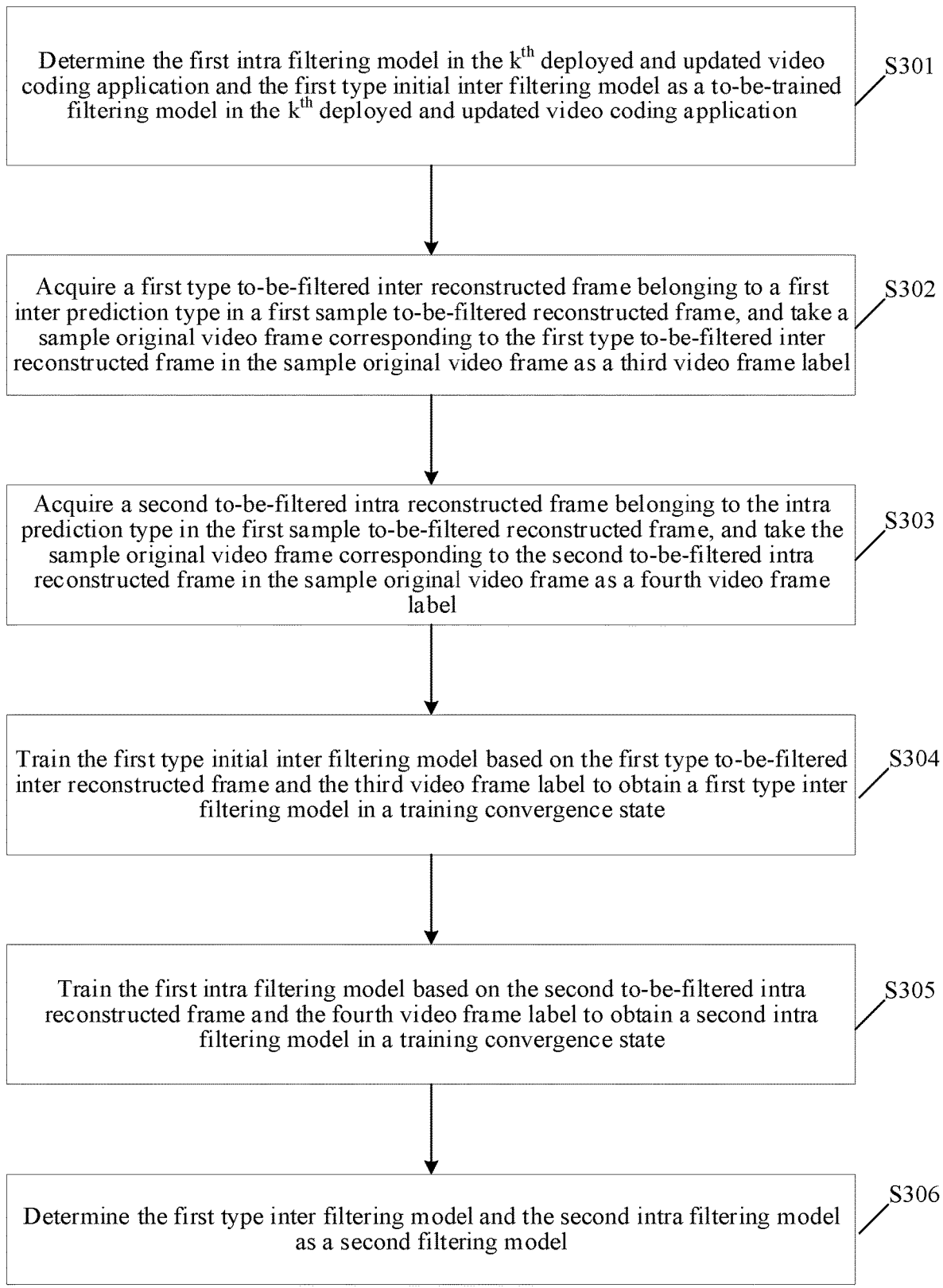
FIG. 9 is a schematic flowchart of a training filtering model according to an embodiment of this disclosure.

For the convenience of understanding, referring to FIG. 9, FIG. 9 is a schematic flowchart of a training filtering model according to an embodiment of this disclosure. As shown in FIG. 9, the process may at least include the following steps S301 to S306:

S301: determine the first intra filtering model in the kth deployed and updated video coding application and the first type initial inter filtering model as a to-be-trained filtering model in the kth deployed and updated video coding application.

Specifically, every time the to-be-trained model is determined, when a certain filtering model (including the intra filtering model and the inter filtering model) is untrained, a certain filtering model may be selected preferentially from the untrained models to serve as a to-be-trained model until all the filtering models are trained; and at this time, when all the filtering models are trained, during determining of the to-be-trained model, all the filtering models that have been trained may serve as the to-be-trained models again, and all the models are trained and adjusted based on new training data at the same time. Certainly, every time the to-be-trained model is trained, when a certain filtering model (including the intra filtering model and the inter filtering model) is untrained, a certain filtering model may be selected from the untrained models in advance to serve as the to-be-trained models together with the trained model. Every time the to-be-trained model is trained, when a certain filtering model (including the intra filtering model and the inter filtering model) is untrained, all untrained filtering modes may serve as to-be-trained models together. Then in the embodiments of this disclosure, the first intra filtering model in the kth deployed and updated video coding application is a trained model, and the first type initial inter filtering model and the second type initial inter filtering model are untrained models. The embodiments of this disclosure may take the first intra filtering model and the first type initial inter filtering model (or the second type initial inter filtering model) as to-be-trained models together, certainly may only take the first type initial inter filtering model (or the second type initial inter filtering model) as a to-be-trained model, or may take the first type initial inter filtering model and the second type initial inter filtering model as to-be-trained models together.

Step S302: acquire a first type to-be-filtered inter reconstructed frame belonging to a first inter prediction type in a first sample to-be-filtered reconstructed frame, and take a sample original video frame corresponding to the first type to-be-filtered inter reconstructed frame in the sample original video frame as a third video frame label.

Specifically, the intra filtering model may be trained by the video frame with the frame type being the intra prediction type, and the inter filtering model may be trained by the video frame with the frame type being the inter prediction type. Then, when the to-be-trained filtering model in the kth deployed and updated video coding application includes the first type initial inter filtering model, the to-be-filtered reconstructed frame (that may be called a first type to-be-filtered inter reconstructed frame) belonging to the first inter prediction type may be acquired in the first training data, and the sample original video frame corresponding to the first type to-be-filtered inter reconstructed frame in the sample original video frame serves as a corresponding video frame label (that may be called the third video frame label).

Step S303: acquire a second to-be-filtered intra reconstructed frame belonging to the intra prediction type in the first sample to-be-filtered reconstructed frame, and take the sample original video frame corresponding to the second to-be-filtered intra reconstructed frame in the sample original video frame as a fourth video frame label.

Specifically, similarly, when the to-be-trained filtering model in the kth deployed and updated video coding application includes the first intra filtering model, the to-be-filtered reconstructed frame (that may be called the second to-be-filtered intra reconstructed frame) belonging to the intra prediction type may be acquired in the first training data, and the sample original video frame corresponding to the second to-be-filtered intra reconstructed frame in the sample original video frame as a corresponding video frame label (that may be called the fourth video frame label).

Step S304: train the first type initial inter filtering model based on the first type to-be-filtered inter reconstructed frame and the third video frame label to obtain a first type inter filtering model in a training convergence state.

Specifically, the first type initial inter filtering model may be trained and adjusted though the first type to-be-filtered inter reconstructed frame and the first video frame label to obtain the first type inter filtering model in the training convergence state.

Step S305: train the first intra filtering model based on the second to-be-filtered intra reconstructed frame and the fourth video frame label to obtain a second intra filtering model in a training convergence state.

Specifically, the first intra filtering model may be trained through the second to-be-filtered intra reconstructed frame and the fourth video frame label to obtain the second intra filtering model in the training convergence state.

Step S306: determine the first type inter filtering model and the second intra filtering model as a second filtering model.

Specifically, the second intra filtering model and the first type inter filtering model may serve as the second filtering model. The specific training process of each filtering model may be referenced to the description of the process of training the filtering model in the embodiment corresponding to FIG. 3 above, and details are not described herein again.

When the to-be-trained model in the kth deployed and updated video coding application includes the first type initial inter filtering model and the first intra filtering model, the specific implementation manner of updating the second filtering model in the kth deployed and updated video coding application to obtain a (k+1)th deployed and updated video coding application may be: the first intra filtering model in the kth deployed and updated video coding application may be replaced and updated into the second intra filtering model; and the first type initial inter filtering model in the kth deployed and updated video coding application may be replaced and updated into the first type inter filtering model. That is, the two trained models are respectively updated and replaced.

It may be understood that when the to-be-trained model in the kth deployed and updated video coding application includes the first type initial inter filtering model and the first intra filtering model and it is detected that the (k+1)th deployed and updated video coding application does not meet the filtering quality requirement condition, second training data may be generated through the (k+1)th deployed and updated video coding application and the sample video data, where the second training data includes a sample original video frame as a training label, and a second sample to-be-filtered reconstructed frame corresponding to the sample original video frame, and the second sample to-be-filtered reconstructed frame refers to a video frame that is not trained by the second filtering model in the process of coding and reconstructing the sample original video frame through the (k+1)th deployed and updated video coding application; then, the to-be-trained filtering model (for example, the second type initial inter filtering model) in the (k+1)th deployed and updated video coding application may be trained based on the sample original video frame and the second sample to-be-filtered reconstructed frame to obtain a third filtering model in a training convergence state; then, the third filtering model may be updated and deployed in the (k+1)th deployed and updated video coding application to obtain a (k+2)th deployed and updated video coding application; and when the (k+2)th deployed and updated video coding application meets the filtering quality requirement condition, the (k+2)th deployed and updated video coding application may be determined as a target video coding application.

Taking the case where the to-be-trained filtering model in the (k+1)th deployed and updated video coding application is the second type initial inter filtering model as an example, the specific implementation manner of training the to-be-trained filtering model in the (k+1)th deployed and updated video coding application based on the sample original video frame and the second sample to-be-filtered reconstructed frame to obtain the third filtering model in the training convergence state may be: a second type to-be-filtered inter reconstructed frame belonging to the second inter prediction type may be acquired in the second sample to-be-filtered reconstructed frame, and a sample original video frame corresponding to the second type to-be-filtered inter reconstructed frame in the sample original video frame serves as a fifth video frame label; the second type initial inter filtering model may be trained based on the second type to-be-filtered inter reconstructed frame and the fifth video frame label to obtain a second type inter filtering model in a training convergence state; and the second type inter filtering model is determined as the third filtering model.

Figure 10:
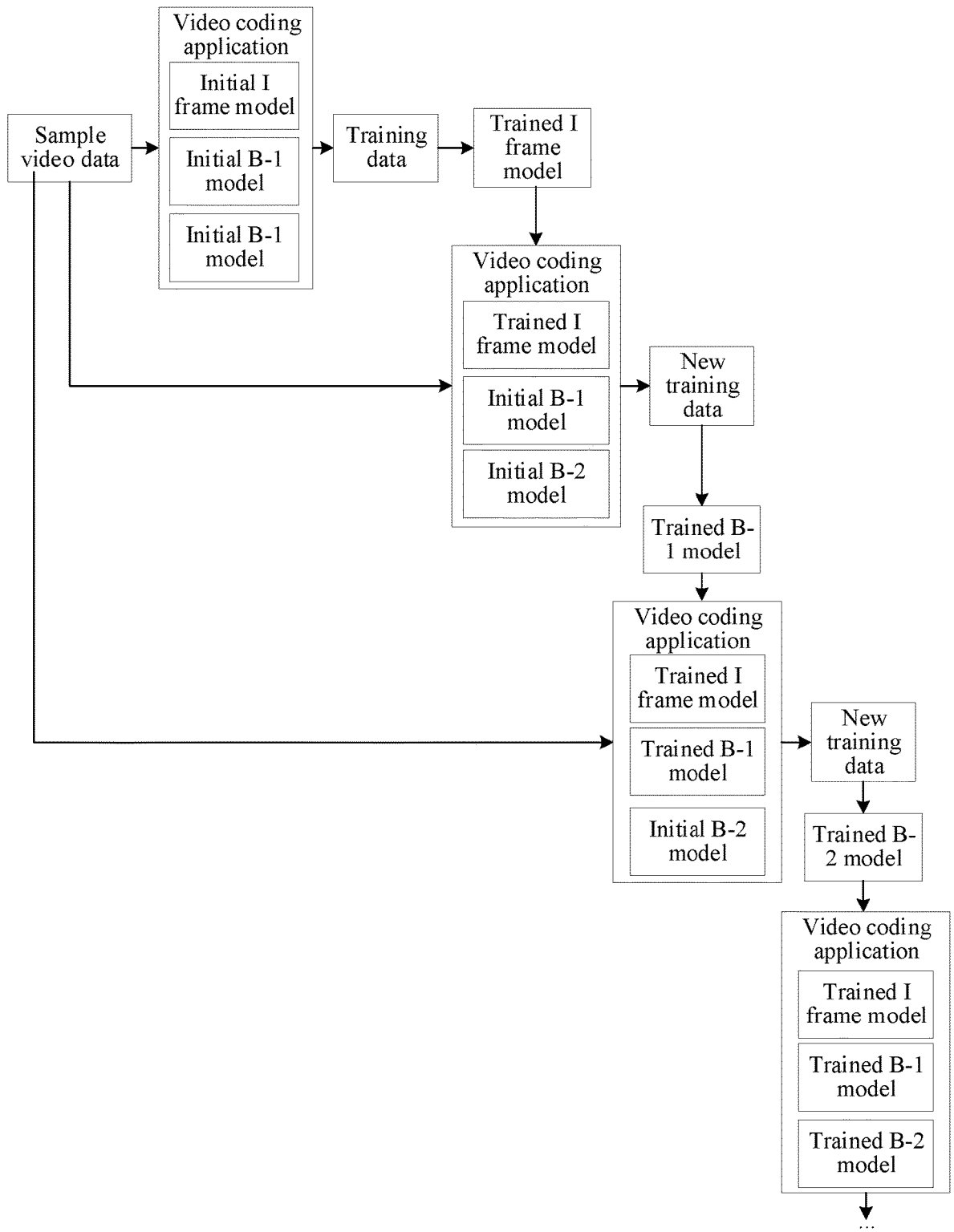
FIG. 10 is a scenario schematic diagram of another model training according to an embodiment of this disclosure.

It may be understood that for the case that the intra prediction coding frame (such as an I frame) has one type of model (that is, an intra filtering model, such as an I frame model) and the inter prediction coding frame (such as a B frame) has two or more than two types of models, the filtering model may be trained by the process shown in FIG. 9. For the convenience of understanding, referring to FIG. 10, FIG. 10 is a scenario schematic diagram of another model training according to an embodiment of this disclosure. As shown in FIG. 10, taking the case where the intra filtering model includes an I frame model and the inter filtering model includes a B-1 model and a B-2 model as an example, in this case, in combination with the scenario shown in FIG. 10, the process of iteratively training the model may include the following steps (1) to (6):

Step (1): when the video coding application includes the initial untrained I frame model, B-1 model and B-2 model, input the sample video data to the video coding application, and output training data by the video coding application.

Step (2): take the initial I frame model in the video coding application as a to-be-trained model, train the I frame model based on the new training data (train the I frame model based on an I frame original video frame and an I frame to-be-filtered reconstructed frame in the training data) to obtain an I frame model in a training convergence state (that is, a trained I frame model), and replace the initial I frame model in the video coding application with the trained I frame model to keep the initial B-1 and B-2 models unchanged and obtain a first deployed and updated video coding application.

Step (3): input the sample video data to the first deployed and updated video coding application, and output new training data through the first deployed and updated video coding application.

Step (4): take the initial B-1 model in the first deployed and updated video coding application as a to-be-trained model, train the initial B-1 model based on new training data (train the B-1 model based on the original video frame corresponding to the B-1 model and the to-be-filtered reconstructed frame in the training data) to obtain a B-1 model in a training convergence state (a trained B-1 model), and replace the initial B-1 model in the first deployed and updated video coding application with the trained B-1 model to obtain a second deployed and updated video coding application.

Step (5): input the sample video data to the second deployed and updated video coding application, and output new training data through the second deployed and updated video coding application.

Step (6): take the initial B-2 model in the second deployed and updated video coding application as a to-be-trained model, train the B-2 model based on the new training data (train the B-2 model based on the original video frame corresponding to the B-2 model and the to-be-filtered reconstructed frame in the training data) to obtain a B-2 model in a training convergence state, and replace the initial B-2 model in the second deployed and updated video coding application with the trained B-2 model to obtain a third deployed and updated video coding application. Certainly, then, the sample video data may be inputted to the third deployed and updated video coding application again, and new training data is outputted again based on the third deployed and updated video coding application; and at this time, each filtering model in the third deployed and updated video coding application may be respectively trained based on the new training data to obtain a trained model, and the third deployed and updated video coding application is updated and deployed based on the trained model to obtain a fourth deployed and updated video coding application.

Certainly, it may be understood that in the step 4 above, the initial B-1 model and the initial B-2 model may be trained based on the training data to obtain a trained B-1 model and a trained B-2 model, and the initial B-1 model and the initial B-2 model corresponding to the first deployed and updated video coding application are respectively updated and replaced to obtain the second deployed and updated video coding application. After the I frame model, the B-1 model and the B-2 model are trained, new training data may be generated again, and the B-1 model and the B-2 model are trained jointly based on the new training data.

After the video coding application is deployed and updated at each time, the application may be detected to determine whether the application meets the filtering requirement condition; and when the filtering requirement condition is not met, a new training data set is generated again, the model is trained again based on the new training data set, and the video coding application is deployed and updated again based on the trained mode until the video coding application meets the filtering requirement condition.

In the embodiments of this disclosure, the inter filtering model is repeatedly trained by updating the training data set, so that the consistency of training and testing of the inter prediction coding frame can be improved, thereby improving the coding efficiency and the filtering quality of the video coding application, and reducing the distortion degree of the coded video.

The process of iteratively training the model provided by the embodiments of this disclosure may be suitable for iterative training of other models, for example, may also be suitable for iterative training of the inter prediction model and iterative training of the intra prediction model. That is, the model training mode, provided by the embodiments of this disclosure, of repeatedly training the model based on the training data re-generated by the application after model deployment and then updating and deploying the application until the application meets the performance requirement condition is not limited to the iterative training of the filtering model.

Figure 11:
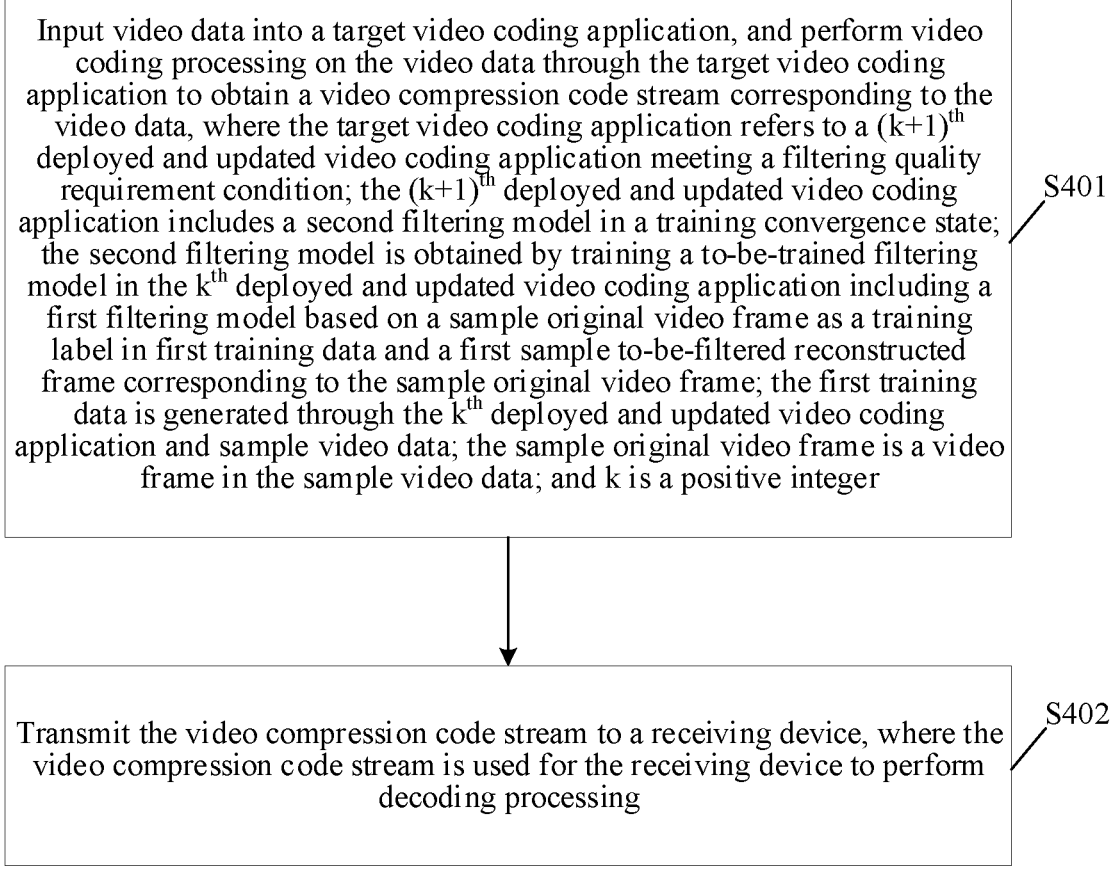
FIG. 11 is a schematic flowchart of a data processing method according to an embodiment of this disclosure.

It may be understood that after the target video coding application is determined by a method for iteratively training the model provided by the embodiments of this disclosure, the target video coding application may be inputted to use, that is, the target video coding application may be configured to perform video coding processing on video data. For example, in a video call scenario, during video call of two users, a terminal device corresponding to a user a may perform video coding processing on video data associated with the user a based on a target video coding application, and a video compression code stream is transmitted to a terminal device corresponding to a user b (a user performing video call with the user a) after a video compression code stream is obtained, so that the terminal device corresponding to the user b may perform decoding and output video data associated with the user a in a display interface. For the convenience of understanding, referring to FIG. 11, FIG. 11 is a schematic flowchart of a data processing method according to an embodiment of this disclosure, and the process may be the application process of the target video coding application. As shown in FIG. 11, the process may at least include the following steps S401 to S402:

Step S401: input video data into a target video coding application, and perform video coding processing on the video data through the target video coding application to obtain a video compression code stream corresponding to the video data, where the target video coding application refers to a (k+1)th deployed and updated video coding application meeting a filtering quality requirement condition; the (k+1)th deployed and updated video coding application includes a second filtering model in a training convergence state; the second filtering model is obtained by training a to-be-trained filtering model in the kth deployed and updated video coding application including a first filtering model based on a sample original video frame as a training label in first training data and a first sample to-be-filtered reconstructed frame corresponding to the sample original video frame; the first training data is generated through the kth deployed and updated video coding application and sample video data; the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer.

Specifically, the specific process of determining the target video coding application may be referenced to the description of the embodiment corresponding to FIG. 2, and details are not described herein again.

Step S402: transmit the video compression code stream to a receiving device to make the receiving device decode the video compression code stream.

Specifically, the computer device may transmit the video compression code stream to the receiving device (for example, a terminal device receiving the video compression code stream), and the receiving device may decode the video compression code stream.

In the embodiments of this disclosure, the inter filtering model is repeatedly trained by updating the training data set, so that the consistency of training and testing of the inter prediction coding frame can be improved, thereby improving the coding efficiency and the filtering quality of the video coding application, and reducing the distortion degree of the coded video.

Figure 12:
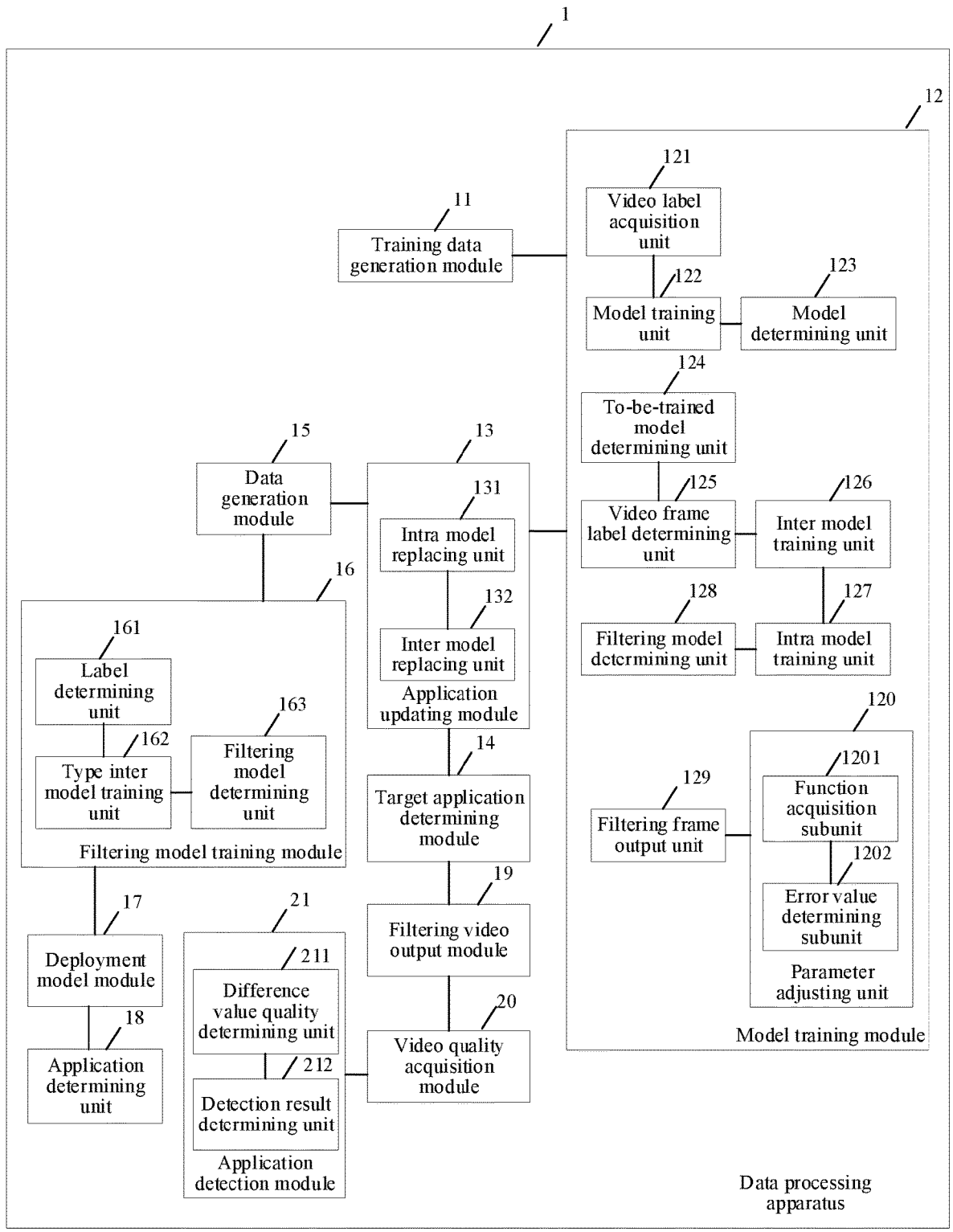
FIG. 12 is a structural schematic diagram of a data processing apparatus according to an embodiment of this disclosure.

Further, referring to FIG. 12, FIG. 12 is a structural schematic diagram of a data processing apparatus according to an embodiment of this disclosure. The data processing apparatus may be a computer instruction (including a program code) running in the computer device, for example, the data processing apparatus is one application software. The data processing apparatus may be configured to perform the method shown in FIG. 3. As shown in FIG. 12, the processing apparatus 1 may include: a training data generation module 11, a model training module 12, an application updating module 13 and a target application determining module 14.

The training data generation module 11 is configured to input sample video data to a kth deployed and updated video coding application including a first filtering model; and the training data generation module 11 is further configured to generate first training data through the kth deployed and updated video coding application and sample video data, where the first training data includes a sample original video frame as a training label, and a first sample to-be-filtered reconstructed frame corresponding to the sample original video frame; the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer.

The model training module 12 is configured to: based on the sample original video frame and the first sample to-be-filtered reconstructed frame, train a to-be-trained filtering model in the kth deployed and updated video coding application to obtain a second filtering model in a training convergence state.

The application updating module 13 is configured to update and deploy the second filtering model in the kth deployed and updated video coding application to obtain a (k+1)th deployed and updated video coding application.

The target application determining module 14 is configured to: when the (k+1)th deployed and updated video coding application meets a filtering quality requirement condition, determine the (k+1)th deployed and updated video coding application as a target video coding application for performing video coding processing on the video data.

The specific implementation manner of the training data generation module 11, the model training module 12, the application updating module 13 and the target application determining module 14 may be referenced to the description of the steps S101-S103 in the embodiment corresponding to FIG. 2 above, and details are not described herein again.

In one embodiment, the first filtering model includes a first intra filtering model for filtering a to-be-filtered reconstructed frame belonging to an intra prediction type; the first intra filtering model is trained based on an initial intra filtering model in a (k−1)th deployed and updated video coding application, and the kth deployed and updated video coding application further includes an untrained initial inter filtering model; and the initial inter filtering model is configured to filter the to-be-filtered reconstructed frame belonging to an inter prediction type, and the to-be-trained filtering model in the kth deployed and updated video coding application includes the initial inter filtering model and the first intra filtering model.

The model training module 12 may include: a video label acquisition unit 121, a model training unit 122 and a model determining unit 123.

The video label acquisition unit 121 is configured to acquire a to-be-filtered inter reconstructed frame belonging to the inter prediction type in the first sample to-be-filtered reconstructed frame, and take a sample original video frame corresponding to the to-be-filtered inter reconstructed frame in the sample original video frame as a first video frame label.

The video label acquisition unit 121 is further configured to acquire a first to-be-filtered intra reconstructed frame belonging to the intra prediction type in the first sample to-be-filtered reconstructed frame, and take the sample original video frame corresponding to the first to-be-filtered intra reconstructed frame in the sample original video frame as a second video frame label.

The model training unit 122 is configured to train the initial inter filtering model based on the to-be-filtered inter reconstructed frame and the first video frame label to obtain a first inter filtering model in a training convergence state.

The model training unit 122 is further configured to train the first intra filtering model based on the to-be-filtered intra reconstructed frame and the second video frame label to obtain a second intra filtering model in a training convergence state.

The model determining unit 123 is configured to determine the first inter filtering model and the second intra filtering model as a second filtering model.

The specific implementation manner of the video label acquisition unit 121, the model training unit 122 and the model determining unit 123 may be referenced to the description of the steps S501-S505 in the embodiment corresponding to FIG. 6 above, and details are not described herein again.

In one embodiment, the application updating module 13 may include: an intra model replacing unit 131 and an inter model replacing unit 132.

The intra model replacing unit 131 is configured to replace and update the first intra filtering model in the kth deployed and updated video coding application into the second intra filtering model.

The inter model replacing unit 132 is configured to replace and update the initial inter filtering model in the kth deployed and updated video coding application into the first inter filtering model.

The specific implementation manner of the intra model replacing unit 131 and the inter model replacing unit 132 may be referenced to the description of step S505 in the embodiment corresponding to FIG. 6 above, and details are not described herein again.

In one embodiment, the first filtering model includes a first intra filtering model for filtering a to-be-filtered reconstructed frame belonging to an intra prediction type; the first intra filtering model is trained based on an initial intra filtering model in a (k−1)th deployed and updated video coding application, and the kth deployed and updated video coding application further includes an untrained first type initial inter filtering model and an untrained second type initial inter filtering model; and the first type initial inter filtering model is configured to filter the to-be-filtered reconstructed frame belonging to the first inter prediction type, and the second type initial inter filtering model is configured to filter the to-be-filtered reconstructed frame belonging to the second inter prediction type.

The model training module 12 may include: a to-be-trained model determining unit 124, a video frame label determining unit 125, an inter model training unit 126, an intra model training unit 127 and a filtering model determining unit 128.

The to-be-trained model determining unit 124 is configured to determine the first intra filtering model in the kth deployed and updated video coding application and the first type initial inter filtering model as a to-be-trained filtering model in the kth deployed and updated video coding application.

The video frame label determining unit 125 is configured to acquire a first type to-be-filtered inter reconstructed frame belonging to a first inter prediction type in a first sample to-be-filtered reconstructed frame, and take a sample original video frame corresponding to the first type to-be-filtered inter reconstructed frame in the sample original video frame as a third video frame label.

The video frame label determining unit 125 is further configured to acquire a second to-be-filtered intra reconstructed frame belonging to the intra prediction type in the first sample to-be-filtered reconstructed frame, and take the sample original video frame corresponding to the second to-be-filtered intra reconstructed frame in the sample original video frame as a fourth video frame label.

The inter model training unit 126 is configured to train the first type initial inter filtering model based on the first type to-be-filtered inter reconstructed frame and the third video frame label to obtain a first type inter filtering model in a training convergence state.

The intra model training unit 127 is configured to train the first intra filtering model based on the second to-be-filtered intra reconstructed frame and the fourth video frame label to obtain a second intra filtering model in a training convergence state.

The filtering model determining unit 128 is configured to determine the first type inter filtering model and the second intra filtering model as a second filtering model.

The specific implementation manner of the to-be-trained model determining unit 124, the video frame label determining unit 125, the inter model training unit 126, the intra model training unit 127 and the filtering model determining unit 128 may be referenced to the descriptions of steps S801-S806 in the embodiment corresponding to FIG. 9 above, and details are not described herein.

In one embodiment, the data processing apparatus 1 may further include: a data generation module 15, a filtering model training module 16, a deployment model module 17 and a target application determining module 18.

The data generation module 15 is configured to: when a (k+1)th deployed and updated video coding application does not meet the filtering quality requirement condition, generate second training data through the (k+1)th deployed and updated video coding application and sample video data. The second training data includes a sample original video frame as a training label, and a second sample to-be-filtered reconstructed frame corresponding to the sample original video frame, and the second sample to-be-filtered reconstructed frame refers to a video frame that is not trained by the second filtering model in the process of coding and reconstructing the sample original video frame through the (k+1)th deployed and updated video coding application.

The filtering model training module 16 is configured to train the to-be-trained filtering model in the (k+1)th deployed and updated video coding application based on the sample original video frame and the second sample to-be-filtered reconstructed frame to obtain the third filtering model in the training convergence state.

The deployment model module 17 is configured to update and deploy the third filtering model in the (k+1)th deployed and updated video coding application to obtain a (k+2)th deployed and updated video coding application.

The target application determining module 18 is configured to: when the (k+2)th deployed and updated video coding application meets a filtering quality requirement condition, determine the (k+2)th deployed and updated video coding application as a target video coding application.

The specific implementation manner of the data generation module 15, the filtering model training module 16, the deployment model module 17 and the target application determining module 18 may be referenced to the description of step S806 in the embodiment corresponding to FIG. 9 above, and details are not described herein again.

In one embodiment, a to-be-treated filtering model in the (k+1)th deployed and updated video coding application includes a second type initial inter filtering model.

The filtering model training module 16 may include: a label determining unit 161, a type inter model training unit 162 and a filtering model determining unit 163.

The label determining unit 161 is configured to acquire a second type to-be-filtered inter reconstructed frame belonging to the second inter prediction type in the second sample to-be-filtered reconstructed frame, and take a sample original video frame corresponding to the second type to-be-filtered inter reconstructed frame in the sample original video frame as a fifth video frame label.

The type inter model training unit 162 is configured to train the second type initial inter filtering model based on the second type to-be-filtered inter reconstructed frame and the fifth video frame label to obtain a second type inter filtering model in a training convergence state.

The filtering model determining unit 163 is configured to determine the second type inter filtering model as the third filtering model.

The specific implementation manner of the label determining unit 161, the type inter model training unit 162 and the filtering model determining unit 163 may be referenced to the description of step S806 in the embodiment corresponding to FIG. 9 above, and details are not described herein again.

In one embodiment, the model training module 12 may include: a filtering frame output unit 129 and a parameter adjusting unit 120.

The filtering frame output unit 129 is configured to input the first sample to-be-filtered reconstructed frame to the first filtering model, and output a sample filtering reconstructed frame corresponding to the first sample to-be-filtered reconstructed frame through the first filtering model.

The parameter adjusting unit 120 is configured to determine an error value between a sample filtering reconstructed frame and a sample original video frame.

The parameter adjusting unit 120 is further configured to adjust a model parameter of the first filtering model through the error value to obtain a first filtering model with an adjusted model parameter.

The parameter adjusting unit 120 is further configured to: when the first filtering model with the adjusted model parameter meets a model convergence condition, determine the first filtering model with the adjusted model parameter as a second filtering model in a training convergence state.

The specific implementation manner of the filtering frame output unit 129, the parameter adjusting unit 120 and the model determining unit 123 may be referenced to the description of step S102 in the embodiment corresponding to FIG. 3 above, and details are not described herein again.

In one embodiment, the parameter adjusting unit 120 includes: a function acquisition subunit 1201 and an error value determination subunit 1202.

The function acquisition subunit 1201 is configured to acquire a loss function corresponding to the kth deployed and updated video coding application.

The error value determination subunit 1202 is configured to acquire the original image quality corresponding to the sample original video frame based on the loss function and take the original image quality as an image quality label.

The error value determination subunit 1202 is further configured to acquire filtering image quality corresponding to the sample filtering reconstructed frame based on the loss function, and determine an error value between the sample filtering video frame and the sample original video frame through the loss function, the image quality label and the filtering image quality.

The specific implementation manner of the function acquisition subunit 1201 and the error value determination subunit 1202 may be referenced to the description of step S102 in the embodiment corresponding to FIG. 2 above, and details are not described herein again.

In one embodiment, the loss function includes an absolute value loss function and a square error loss function;

the error value determination subunit 1202 is further configured to determine a first error value between the sample filtering reconstructed frame and the sample original video frame through the square error loss function, the image quality label and the filtering image quality;

the error value determination subunit 1202 is further configured to determine a second error value between the sample filtering reconstructed frame and the sample original video frame through the absolute value loss function, the image quality label and the filtering image quality; and the error value determination subunit 1202 is further configured to perform operation processing on the first error value and the second error value, and determine the result obtained through the operation as an error value between the sample filtering reconstructed frame and the sample original video frame.

In one embodiment, the data processing apparatus 1 may further include: a filtering video output module 19, a video quality acquisition module 20 and an application detection module 21.

The filtering video output module 19 is configured to input the sample video data to the (k+1)th deployed and updated video coding application, and output to-be-detected filtering video data through the (k+1)th deployed and updated video coding application.

The video quality acquisition module 20 is configured to acquire filtering video quality corresponding to the to-be-detected filtering video data, and original video quality corresponding to the sample video data.

The application detection module 21 is configured to detect the (k+1)th deployed and updated video coding application according to the filtering video quality and the original video quality.

The specific implementation manner of the filtering video output module 19, the video quality acquisition module 20 and the application detection module 21 may be referenced to the description of step S103 in the embodiment corresponding to FIG. 3 above, and details are not described herein again.

In one embodiment, the application detection module 21 may include: a difference value quality determining unit 211 and a detection result determining unit 212.

The difference value quality determining unit 211 is configured to determine the difference video quality between the filtering video quality and the original video quality.

The detection result determining unit 212 is configured to: when the difference video quality is less than a difference quality threshold, determine that the second video coding application meets the filtering quality requirement condition.

The detection result determining unit 212 is further configured to: when the difference video quality is greater than a difference quality threshold, determine that the second video coding application does not meet the filtering quality requirement condition.

The specific implementation manner of the difference value quality determining unit 211 and the detection result determining unit 212 may be referenced to the description of step S103 in the embodiment corresponding to FIG. 2 above, and details are not described herein again.

In the embodiments of this disclosure, the inter filtering model is repeatedly trained by updating the training data set, so that the consistency of training and testing of the inter prediction coding frame can be improved, thereby improving the coding efficiency and the filtering performance of the video coding application, and reducing the distortion degree of the coded video.

Figure 13:
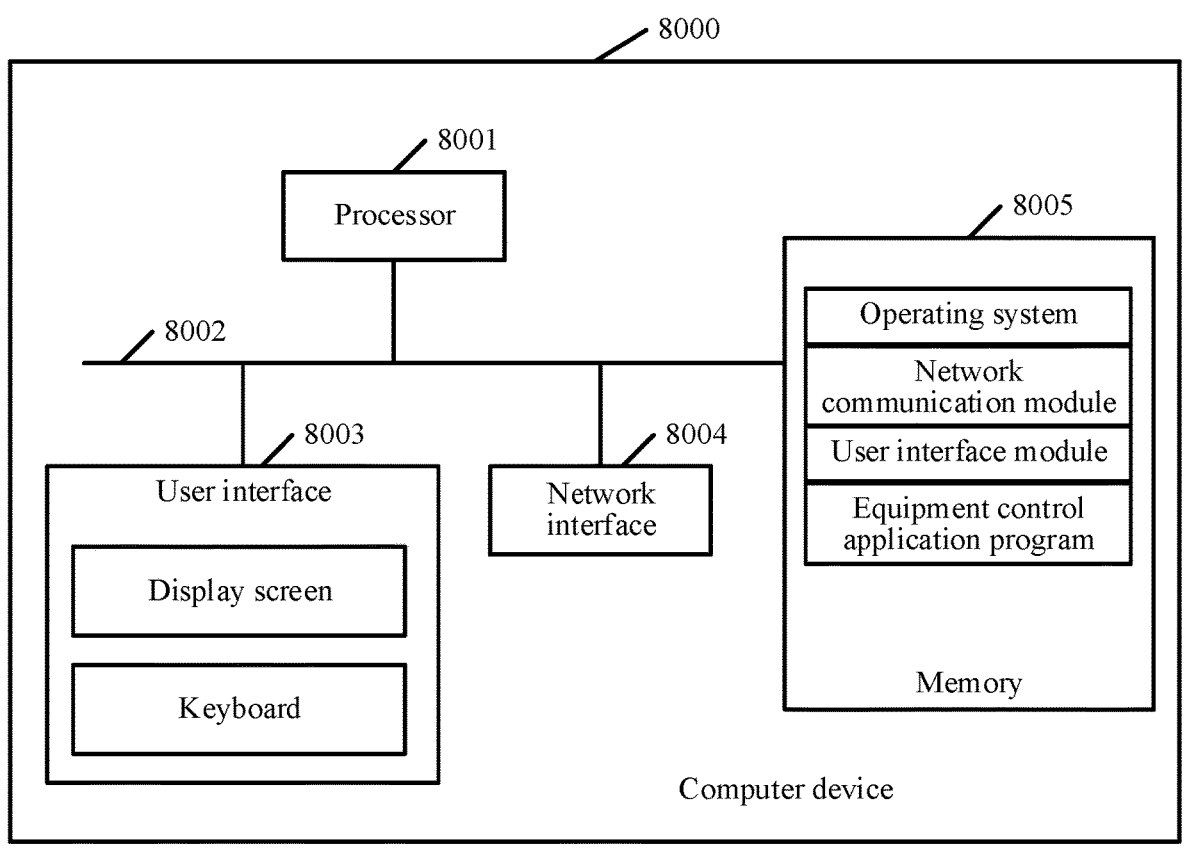
FIG. 13 is a structural schematic diagram of a computer device according to an embodiment of this disclosure.

Further, referring to FIG. 13, FIG. 13 is a structural schematic diagram of a data processing apparatus according to an embodiment of this disclosure. The data processing apparatus may be a computer instruction (including a program code) running in the computer device, for example, the data processing apparatus is one application software. The data processing apparatus may be configured to perform the method shown in FIG. 11. As shown in FIG. 13, the data processing apparatus 2 may include: a code stream generation module 31 and a code stream transmitting module 32.

The code stream generation module 31 is configured to input video data into a target video coding application, and perform video coding processing on the video data through the target video coding application to obtain a video compression code stream corresponding to the video data, where the target video coding application refers to a (k+1)th deployed and updated video coding application meeting a filtering quality requirement condition; the (k+1)th deployed and updated video coding application includes a second filtering model in a training convergence state, the second filtering model is obtained by training a to-be-trained filtering model in the kth deployed and updated video coding application including a first filtering model based on a sample original video frame as a training label in first training data and a first sample to-be-filtered reconstructed frame corresponding to the sample original video frame; the first training data is generated through the kth deployed and updated video coding application and sample video data, the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer.

The code stream transmitting module 32 is configured to transmit the video compression code stream to a receiving device to make the receiving device decode the video compression code stream.

The specific implementation manner of the code stream generation module 31 and the code stream transmitting module 32 may be referenced to the description in the embodiment corresponding to FIG. 11 above, and details are not described herein again.

Further, referring to FIG. 13, FIG. 13 is a structural schematic diagram of a computer device according to an embodiment of this disclosure. As shown in FIG. 13, the apparatus 1 in the embodiment corresponding to FIG. 11 or the apparatus 2 in the embodiment corresponding to FIG. 12 above may be applied to the computer device 8000. The computer device 8000 may include: a processor 8001 (processing circuitry), a network interface 8004 and a memory 8005 (non-transitory computer-readable storage medium). In addition, the computer device 8000 above may further include: a user interface 8003 and at least one communication bus 8002. The communication bus 8002 is configured to implement connection and communication between these components. The user interface 8003 may include a display screen and a keyboard. The user interface 8003 may further include a standard wired interface and a standard wireless interface. The network interface 8004 may include a standard wired interface and a standard wireless interface (such as a Wi-Fi interface). The memory 8005 may be a high-speed RAM memory, or a non-volatile memory, for example, at least one disk memory. The memory 8005 may be at least one storage apparatus that is located far away from the foregoing processor 8001. As shown in FIG. 13, the memory 8005, as a computer storage medium, may include an operating system, a network communication module, a user interface module, and a device-control application program. As used herein, the term "processing circuitry" includes one or more processors and the term "non-transitory computer-readable storage medium" includes one or more memories or memory structures.

In the computer device 8000 shown in FIG. 13, the network interface 8004 may provide a network communication function; the user interface 8003 is mainly configured to provide an input interface for a user; and the processor 8001 may be configured to call a device control application program stored in the memory 8005 to implement the following operations:

inputting sample video data to a kth deployed and updated video coding application including a first filtering model, and generating first training data through the kth deployed and updated video coding application and the sample video data, where the first training data includes a sample original video frame as a training label, and a first sample to-be-filtered reconstructed frame corresponding to the sample original video frame; the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer.

based on the sample original video frame and the first sample to-be-filtered reconstructed frame, training a to-be-trained filtering model in the kth deployed and updated video coding application to obtain a second filtering model in a training convergence state, and updating and deploying the second filtering model in the kth deployed and updated video coding application to obtain a (k+1)th deployed and updated video coding application; and when the (k+1)th deployed and updated video coding application meets a filtering quality requirement condition, determining the (k+1)th deployed and updated video coding application as a target video coding application for performing video coding processing on the video data;

or to implement the following operations:

inputting video data into a target video coding application, and performing video coding processing on the video data through the target video coding application to obtain a video compression code stream corresponding to the video data, where the target video coding application refers to a (k+1)th deployed and updated video coding application meeting a filtering quality requirement condition; the (k+1)th deployed and updated video coding application includes a second filtering model in a training convergence state, the second filtering model is obtained by training a to-be-trained filtering model in the kth deployed and updated video coding application including a first filtering model based on a sample original video frame as a training label in first training data and a first sample to-be-filtered reconstructed frame corresponding to the sample original video frame; the first training data is generated through the kth deployed and updated video coding application and sample video data, the first sample to-be-filtered reconstructed frame refers to a reconstructed frame which is not filtered by the first filtering model in the process of reconstructing the sample original video frame through the kth deployed and updated video coding application; the sample original video frame is a video frame in the sample video data; and k is a positive integer; and transmitting the video compression code stream to the receiving device to make the receiving device decode the video compression code stream.

It is to be understood that the computer device 8000 described in the embodiments of this disclosure may perform the description of the data processing method in the embodiment corresponding to FIG. 2 or FIG. 11, and may perform the description of the data processing apparatus 1 in the embodiment corresponding to FIG. 11 or the data processing apparatus 2 in the embodiment corresponding to FIG. 2, and details are not described herein again. In addition, the description of beneficial effects of the same method will not be described herein again.

In addition, the embodiments of this disclosure further provide a computer-readable storage medium; the computer-readable storage medium above stores a computer program executed by the aforementioned computer device 1000 for data processing; the computer program includes a program instruction; and when executing the program instruction, the processor can perform the description of the data processing method in the embodiment corresponding to FIG. 3 or FIG. 11; therefore, details are not described herein again. In addition, the description of beneficial effects of the same method will not be described herein again. For technical details that are not disclosed in the computer-readable storage medium embodiments of this disclosure, refer to the descriptions of the method embodiments of this disclosure.

The computer-readable storage medium above may be a data processing apparatus or an internal storage unit of the computer device provided by any one of the foregoing embodiments, such as a hard disk or an internal memory of the computer device. The computer-readable storage medium may also be an internal storage device of the computer device, for example, a pluggable hard disk, a smart media card (SMC), a secure digital (SD) card and, a flash card, which the computer device is equipped with. Further, the computer-readable storage medium may further include an internal storage unit of the computer device, or include an external storage device. The computer-readable storage medium is configured to store the computer program, and other programs and data required by the computer device. The computer-readable storage medium may further be configured to temporarily store data that has been outputted or will be outputted.

One aspect of the embodiments of this disclosure provides a computer program product or a computer program. The computer program product or the computer program includes a computer instruction, and the computer instruction is stored in a computer-readable storage medium. A processor of a computer device reads the computer instruction from the computer-readable storage medium, and executes the computer instruction to cause the computer device to perform the method provided in one aspect of the embodiments of this disclosure.

Terms such as "first" and "second" in this specification, claims, and the accompanying drawings of the embodiments of this disclosure are used to distinguish different objects and are not used to describe a specific sequence. In addition, the terms "include" and any variant thereof are intended to cover a non-exclusive inclusion. For example, a process, method, apparatus, product, or device that includes a series of steps or units is not limited to the listed steps or units, but further may include a step or unit that is not listed, or further may include other steps or units that are intrinsic to the process, method, apparatus, product, or device.

Those of ordinary skill in the art may realize that the units and algorithm steps of each example described in the embodiments disclosed herein can be realized in electronic hardware, computer software or a combination of the two. In order to clearly describe the interchangeability of hardware and software, the composition and steps of each example have been generally described in the above description according to functions. Whether the functions are executed in a mode of hardware or software depends on particular applications and design constraint conditions of the technical solutions. A person skilled in the art may use different methods to implement the described functions for each particular application, but it is to be not considered that the implementation goes beyond the scope of this disclosure.

The method and related apparatus provided by the embodiments of this disclosure are described with reference to the method flowchart and/or the structural schematic diagram provided by the embodiments of this disclosure. Specifically, each process and/or block, and a combination of the process and/or block in the flowchart and/or the block diagram of the method flowchart and/or the structural schematic diagram may be realized by the computer program instruction. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A data processing method, comprising:
generating first training data through a $k^{th}$ updated video coding application comprising a first filtering model, the first training data comprising a sample original video frame as a training label, and a first sample to-be-filtered reconstructed frame output from the $k^{th}$ updated video coding application and corresponding to the sample original video frame, k being a positive integer;
based on the sample original video frame and the first sample to-be-filtered reconstructed frame, iteratively training a second filtering model in the $k^{th}$ updated video coding application until the second filtering model reaches a training convergence state, the second filtering model being configured to output a filtered reconstructed frame based on the first sample to-be-filtered reconstructed frame, and,
in response to determining that the second filtering model satisfies a model convergence condition based on a filtering performance metric or loss function of the second filtering model, integrating the second filtering model in the training convergence state into the $k^{th}$ updated video coding application to obtain a $(k+1)^{th}$ updated video coding application; and in response to a determination that the $(k+1)^{th}$ updated video coding application meets a filtering quality requirement condition, determining the $(k+1)^{th}$ updated video coding application as a target video coding application for performing video coding processing.

2. The method according to claim 1, wherein the first sample to-be-filtered reconstructed frame is a reconstructed frame that is not filtered by the first filtering model during reconstructing the sample original video frame through the $k^{th}$ updated video coding application.

3. The method according to claim 1, wherein
the first filtering model comprises a first intra filtering model for filtering a to-be-filtered reconstructed frame belonging to an intra prediction type;
the first intra filtering model is trained based on an initial intra filtering model in a $(k-1)^{th}$ updated video coding application, and the $k^{th}$ updated video coding application further comprises an untrained initial inter filtering model; and
the initial inter filtering model is configured to filter a to-be-filtered reconstructed frame belonging to an inter prediction type, and the second filtering model in the $k^{th}$ updated video coding application comprises the initial inter filtering model and the first intra filtering model.

4. The method according to claim 3, wherein the training the second filtering model comprises:
acquiring a to-be-filtered inter reconstructed frame as the first sample to-be-filtered reconstructed frame, and taking a sample original video frame corresponding to the to-be-filtered inter reconstructed frame as a first video frame label;
based on the to-be-filtered inter reconstructed frame and the first video frame label, training the initial inter filtering model to obtain a first inter filtering model in the training convergence state;
acquiring a first to-be-filtered intra reconstructed frame as the first sample to-be-filtered reconstructed frame, and taking a sample original video frame corresponding to the first to-be-filtered intra reconstructed frame as a second video frame label;
based on the first to-be-filtered intra reconstructed frame and the second video frame label, training the first intra filtering model to obtain a second intra filtering model in the training convergence state; and
setting the first inter filtering model in the training convergence state and the second intra filtering model in the training convergence state as the second filtering model in the training convergence state.

5. The method according to claim 4, wherein the integrating the second filtering model into the $k^{th}$ updated video coding application comprises:
replacing the first intra filtering model in the $k^{th}$ updated video coding application with the second intra filtering model, and replacing the initial inter filtering model in the $k^{th}$ updated video coding application with the first inter filtering model to obtain the $(k+1)^{th}$ updated video coding application.

6. The method according to claim 5, further comprising:
in response to a determination that the $(k+1)^{th}$ updated video coding application does not meet the filtering quality requirement condition, generating second training data through the $(k+1)^{th}$ updated video coding application, the second training data comprising the sample original video frame as the training label, and a second sample to-be-filtered reconstructed frame output from the $(k+1)^{th}$ updated video coding application and corresponding to the sample original video frame, wherein the second sample to-be-filtered reconstructed frame is not filtered by the second filtering model during reconstructing the sample original video frame through the $(k+1)^{th}$ updated video coding application;
based on the sample original video frame and the second sample to-be-filtered reconstructed frame, training a third filtering model in the $(k+1)^{th}$ updated video coding application to obtain the third filtering model in the training convergence state;
integrating the third filtering model into the $(k+1)^{th}$ updated video coding application to obtain a $(k+2)^{th}$ updated video coding application; and
in response to a determination that the $(k+2)^{th}$ updated video coding application meets the filtering quality requirement condition, determining the $(k+2)^{th}$ updated video coding application as the target video coding application.

7. The method according to claim 6, wherein
the third filtering model in the $(k+1)^{th}$ updated video coding application comprises an initial second type inter filtering model; and
the training the third filtering model in the $(k+1)^{th}$ updated video coding application comprises:
acquiring a second type to-be-filtered inter reconstructed frame as the second sample to-be-filtered reconstructed frame, and taking a sample original video frame corresponding to the second type to-be-filtered inter reconstructed frame as a third video frame label,
based on the second type to-be-filtered inter reconstructed frame and the third video frame label, training the second type initial inter filtering model to obtain the second type inter filtering model in the training convergence state, and
setting the second type inter filtering model in the training convergence state as the third filtering model in the training convergence state.

8. The method according to claim 1, wherein
the first filtering model comprises a first intra filtering model for filtering a to-be-filtered reconstructed intra frame;
the first intra filtering model is trained based on an initial intra filtering model in a $(k-1)^{th}$ updated video coding application, and the $k^{th}$ updated video coding application further comprises an untrained first type initial inter filtering model and an untrained second type initial inter filtering model; and
the first type initial inter filtering model is configured to filter a to-be-filtered reconstructed inter frame of a first inter prediction type, and the second type initial inter filtering model is configured to filter a to-be-filtered reconstructed inter frame of a second inter prediction type.

9. The method according to claim 8, wherein the training the second filtering model in the $k^{th}$ updated video coding application comprises:
setting the first intra filtering model in the $k^{th}$ updated video coding application and the first type initial inter filtering model as the second filtering model in the $k^{th}$ updated video coding application;
acquiring a first type to-be-filtered inter reconstructed frame as the first sample to-be-filtered reconstructed frame, and taking a sample original video frame corresponding to the first type to-be-filtered inter reconstructed frame as a fourth video frame label;

based on the first type to-be-filtered inter reconstructed frame and the fourth video frame label, training the first type initial inter filtering model to obtain the first type inter filtering model in the training convergence state;

acquiring a second to-be-filtered intra reconstructed frame as the first sample to-be-filtered reconstructed frame, and taking a sample original video frame corresponding to the second to-be-filtered intra reconstructed frame as a fifth video frame label;

based on the second to-be-filtered intra reconstructed frame and the fifth video frame label, training the first intra filtering model to obtain a second intra filtering model in the training convergence state; and setting the first type inter filtering model in the training convergence state and the second intra filtering model in the training convergence state as the second filtering model in the training convergence state.

10. The method according to claim 1, wherein the training the second filtering model comprises:

inputting the first sample to-be-filtered reconstructed frame into first second filtering model, and receiving as output from the second filtering model a sample filtered reconstructed frame corresponding to first sample to-be-filtered reconstructed frame;

determining an error value between the sample filtered reconstructed frame and the sample original video frame, and adjusting a model parameter of the second filtering model based on the error value to obtain the second filtering model with an adjusted model parameter; and in response to a determination that the second filtering model with the adjusted model parameter meets the model convergence condition, determining the second filtering model with the adjusted model parameter as the second filtering model in the training convergence state.

11. The method according to claim 10, wherein the determining the error value comprises:

acquiring the loss function corresponding to the $k^{th}$ updated video coding application;

acquiring original image quality corresponding to the sample original video frame based on the loss function; and acquiring filtered image quality corresponding to the sample filtered reconstructed frame based on the loss function, and determining the error value between the sample filtered reconstructed frame and the sample original video frame based on the loss function, the original image quality, and the filtered image quality.

12. The method according to claim 11, wherein the loss function comprises an absolute value loss function and a square error loss function; and the determining the error value between the sample filtered reconstructed frame and the sample original video frame based on the loss function, the original image quality and the filtered image quality comprises:

determining a first error value between the sample filtered reconstructed frame and the sample original video frame based on the square error loss function, the original image quality, and the filtered image quality, determining a second error value between the sample filtered reconstructed frame and the sample original video frame based on the absolute value loss function, the original image quality, and the filtered image quality, and performing an operation on first error value and the second error value, and determining a result obtained by the operation as the error value between the sample filtered reconstructed frame and the sample original video frame.

13. The method according to claim 1, further comprising:

inputting sample video data into the $(k+1)^{th}$ updated video coding application, and outputting to-be-detected filtered video data through the $(k+1)^{th}$ updated video coding application;

acquiring filtered video quality corresponding to the to-be-detected filtered video data, and acquiring original video quality corresponding to the sample video data; and evaluating the $(k+1)^{th}$ updated video coding application according to the filtered video quality and the original video quality.

14. The method according to claim 13, wherein the evaluating the $(k+1)^{th}$ updated video coding application comprises:

determining a difference video quality between the filtered video quality and the original video quality;

in response to a determination that the difference video quality is less than a difference quality threshold, determining that the $(k+1)^{th}$ updated video coding application meets the filtering quality requirement condition; and in response to a determination that the difference video quality is greater than the difference quality threshold, determining that the $(k+1)^{th}$ updated video coding application does not meet the filtering quality requirement condition.

15. The method according to claim 1, further comprising:

inputting video data into the target video coding application, and performing the video coding processing on the video data through the target video coding application to obtain a video compression code stream corresponding to the video data, and transmitting the video compression code stream to a receiving device, the video compression code stream being decoded by the receiving device.

16. A data processing apparatus, comprising:

processing circuitry configured to:

generate first training data through a $k^{th}$ updated video coding application comprising a first filtering model, first training data comprising a sample original video frame as a training label, and a first sample to-be-filtered reconstructed frame output from the $k^{th}$ updated video coding application and corresponding to the sample original video frame, k being a positive integer; and based on the sample original video frame and first sample to-be-filtered reconstructed frame, iteratively train a second filtering model in the $k^{th}$ updated video coding application until the second filtering model reaches a training convergence state, the second filtering model being configured to output a filtered reconstructed frame based on first sample to-be-filtered reconstructed frame, and, in response to determination that the second filtering model satisfies a model convergence condition based on a filtering performance metric or loss function of the second filtering model, integrate the second filtering model in the training convergence state into the $k^{th}$ updated video coding application to obtain a $(k+1)^{th}$ updated video coding application; and in response to a determination that the $(k+1)^{th}$ updated video coding application meets a filtering quality requirement condition, determine the $(k+1)^{th}$ updated video coding application as a target video coding application for performing video coding processing.

17. The apparatus according to claim 16, wherein first sample to-be-filtered reconstructed frame is a reconstructed frame that is not filtered by first filtering model during reconstruction of the sample original video frame through the $k^{th}$ updated video coding application.

18. The apparatus according to claim 16, wherein
first filtering model comprises a first intra filtering model for filtering a to-be-filtered reconstructed frame belonging to an intra prediction type;
first intra filtering model is trained based on an initial intra filtering model in a $(k-1)^{th}$ updated video coding application, and the $k^{th}$ updated video coding application further comprises an untrained initial inter filtering model; and
the initial inter filtering model is configured to filter a to-be-filtered reconstructed frame belonging to an inter prediction type, and the second filtering model in the $k^{th}$ updated video coding application comprises the initial inter filtering model and first intra filtering model.

19. The apparatus according to claim 18, wherein the processing circuitry is further configured to:
acquire a to-be-filtered inter reconstructed frame as first sample to-be-filtered reconstructed frame, and take a sample original video frame corresponding to the to-be-filtered inter reconstructed frame as a first video frame label;
based on the to-be-filtered inter reconstructed frame and first video frame label, train the initial inter filtering model to obtain a first inter filtering model in the training convergence state;
acquire a first to-be-filtered intra reconstructed frame as first sample to-be-filtered reconstructed frame, and take a sample original video frame corresponding to first to-be-filtered intra reconstructed frame as a second video frame label;
based on first to-be-filtered intra reconstructed frame and the second video frame label, train first intra filtering model to obtain a second intra filtering model in the training convergence state; and
set first inter filtering model in the training convergence state and the second intra filtering model in the training convergence state as the second filtering model in the training convergence state.

20. A non-transitory computer-readable storage medium storing computer-readable instructions thereon, which, when executed by processing circuitry, cause the processing circuitry to perform a data processing method comprising:
generating first training data through a $k^{th}$ updated video coding application comprising a first filtering model, first training data comprising a sample original video frame as a training label, and a first sample to-be-filtered reconstructed frame output from the $k^{th}$ updated video coding application and corresponding to the sample original video frame, k being a positive integer;
based on the sample original video frame and first sample to-be-filtered reconstructed frame, iteratively training a second filtering model in the $k^{th}$ updated video coding application until the second filtering model reaches a training convergence state, the second filtering model being configured to output a filtered reconstructed frame based on first sample to-be-filtered reconstructed frame, and,
in response to determining that the second filtering model satisfies a model convergence condition based on a filtering performance metric or loss function of the second filtering model, integrating the second filtering model in the training convergence state into the $k^{th}$ updated video coding application to obtain a $(k+1)^{th}$ updated video coding application; and
in response to a determination that the $(k+1)^{th}$ updated video coding application meets a filtering quality requirement condition, determining the $(k+1)^{th}$ updated video coding application as a target video coding application for performing video coding processing.

* * * * *